United States Patent
Moran et al.

(10) Patent No.: US 9,314,713 B2
(45) Date of Patent: Apr. 19, 2016

(54) APPARATUS AND METHOD FOR RECOVERING A HYDROCARBON DILUENT FROM TAILINGS

(75) Inventors: Kevin Moran, Edmonton (CA); Andy H. Hill, Glen Ellyn, IL (US); Chakravarthy Sishtla, Woodridge, IL (US)

(73) Assignee: Titanium Corporation, Edmonton (CA)

( * ) Notice: Subject to any disclaimer, the term of this patent is extended or adjusted under 35 U.S.C. 154(b) by 1074 days.

(21) Appl. No.: 13/387,627

(22) PCT Filed: May 11, 2011

(86) PCT No.: PCT/US2011/036070
§ 371 (c)(1),
(2), (4) Date: Jan. 27, 2012

(87) PCT Pub. No.: WO2011/143310
PCT Pub. Date: Nov. 17, 2011

(65) Prior Publication Data
US 2012/0132514 A1 May 31, 2012
US 2013/0175156 A9 Jul. 11, 2013

Related U.S. Application Data

(63) Continuation-in-part of application No. 12/778,655, filed on May 12, 2010.

(51) Int. Cl.
*C10G 1/04* (2006.01)
*B01D 17/02* (2006.01)
(Continued)

(52) U.S. Cl.
CPC ........ *B01D 17/0205* (2013.01); *B01D 17/0214* (2013.01); *C10G 1/047* (2013.01); *C10G 2300/802* (2013.01); *C10G 2300/807* (2013.01)

(58) Field of Classification Search
CPC .............. C10G 1/00; C10G 1/02; C10G 1/04; B01D 3/26; B01D 3/38
USPC .................. 203/20, 92, 95, 97; 208/359, 400, 208/424–425
See application file for complete search history.

(56) References Cited

U.S. PATENT DOCUMENTS 3,615,799 A * 10/1971 Gannon et al. ................ 106/278
3,656,938 A    4/1972 Penzes
(Continued)

FOREIGN PATENT DOCUMENTS

CA          861580       1/1971
CA          879996       8/1971
(Continued)

OTHER PUBLICATIONS

Bird, R.B. et al. (1960). Transport Phenomena, Wiley, 780 pgs [Office action cites pp. 313 & 319].*
(Continued)

*Primary Examiner* — Brian McCaig
(74) *Attorney, Agent, or Firm* — Terrence N. Kuharchuk; Rodman & Rodman LLP

(57) ABSTRACT

An apparatus and a method for separating diluted tailings containing a hydrocarbon diluent into a recovered diluent component and a diluent recovered tailings component. The method includes introducing the diluted tailings into a diluent recovery vessel so that they form a tailings pool in the diluent recovery vessel, introducing an amount of stream directly into the tailings pool, mixing the diluted tailings which are contained in the tailings pool, and maintaining the diluted tailings in the diluent recovery vessel for a residence time. The apparatus includes a diluent recovery vessel having a tailings pool section, a steam distributor located in the tailings pool section, and a mixing device associated with the tailings pool section.

64 Claims, 16 Drawing Sheets

(51) Int. Cl.
  *C10G 1/00* (2006.01)
  *C10G 1/02* (2006.01)
  *B01D 3/26* (2006.01)
  *B01D 3/38* (2006.01)

(56) References Cited

U.S. PATENT DOCUMENTS

| | | | |
|---|---|---|---|
| 3,990,885 | A | 11/1976 | Baillie et al. |
| 4,138,467 | A | 2/1979 | Kaminsky et al. |
| 4,150,093 | A | 4/1979 | Kaminsky et al. |
| 4,225,422 | A | 9/1980 | Trevoy et al. |
| 4,302,323 | A * | 11/1981 | Chen ............... 208/89 |
| 4,802,975 | A | 2/1989 | Mehlberg |
| 6,074,558 | A | 6/2000 | Duyvesteyn et al. |
| 6,358,403 | B1 | 3/2002 | Brown et al. |
| 6,712,215 | B2 | 3/2004 | Scheybeler |
| 7,341,658 | B2 | 3/2008 | Reeves |
| 2005/0150844 | A1 | 7/2005 | Hyndman et al. |
| 2007/0175512 | A1* | 8/2007 | Henaut et al. ............... 137/13 |
| 2007/0272596 | A1 | 11/2007 | Erasmus et al. |
| 2008/0099380 | A1 | 5/2008 | Lahaie et al. |
| 2009/0020458 | A1 | 1/2009 | Bozak et al. |
| 2010/0282642 | A1 | 11/2010 | Kan |

FOREIGN PATENT DOCUMENTS

| | | |
|---|---|---|
| CA | 927983 | 6/1973 |
| CA | 1013696 | 7/1977 |
| CA | 1027501 | 3/1978 |
| CA | 1076504 | 4/1980 |
| CA | 1081642 | 7/1980 |
| CA | 1088883 | 11/1980 |
| CA | 1094484 | 1/1981 |
| CA | 1238597 | 6/1988 |
| CA | 1252409 | 4/1989 |
| CA | 1326571 | 1/1994 |
| CA | 2160412 | 4/1996 |
| CA | 2173559 | 10/1996 |
| CA | 2084261 | 2/2000 |
| CA | 2272035 | 3/2004 |
| CA | 2454942 | 7/2005 |
| CA | 2455011 | 7/2005 |
| CA | 2353109 | 12/2005 |
| CA | 2272045 | 11/2006 |
| CA | 2548006 | 11/2007 |
| CA | 2587166 | 10/2008 |
| CA | 2613873 | 10/2008 |
| CA | 2614669 | 12/2008 |
| CA | 2426113 | 5/2009 |
| CA | 2651155 | 8/2009 |
| CA | 2682109 | 1/2010 |

OTHER PUBLICATIONS

"Heavy Minerals from Alberta's Oil Sands—Setting New Standards?"—Second International Heavy Minerals Conference, Oct. 8, 2003, 22 pages.

* cited by examiner

| Feed Identification | Feed Weight (g) | Steam Feed Rate (g/min) | Steam-To-Feed Ratio | Operating Pressure (kPa) | Final Tailings Pool Temperature (°C) |
|---|---|---|---|---|---|
| HMC | 375 ± 0.0 | 0.75 | 0.04 | 101 (14.7 psia) | 99.75 ± 0.5 |
| HMC | 375 ± 0.0 | 0.59 | 0.03 | 101 (14.7 psia) | 99.00 ± 0.0 |
| HMC | 375 | 1.50 | 0.08 | 101 (14.7 psia) | 99 |
| HMC-Washed | 233.00 | 0.75 | 0.06 | 101 (14.7 psia) | 99.00 |
| Fines | 240.75 ± 6.65 | 0.75 | 0.12 | 101 (14.7 psia) | 99.75 ± 0.5 |
| Fines-Dewatered | 214.00 | 0.75 | 0.40 | 101 (14.7 psia) | 99.00 |
| Fines | 233.00 | 0.75 | 0.13 | 122 (17.7 psia) | 105.00 |

FIG. 3a

| Feed Identification | Hydrocarbon Diluent (Naphtha) Content | | Diluent Recovered Tailings Component (Following Centrifuging) | |
|---|---|---|---|---|
| | In Diluted Tailings (wt.%) | In Diluent Recovered Tailings Component (wt.%) | Hydrocarbon Diluent (Naptha) Content- Centrifuge Solids Only (wt.%) | Moisture Content- Centrifuge Solids Only (wt.%) |
| HMC | 1.47 ± 0.05 | 0.121 ± 0.024 | 0.216 ± 0.060 | 22.00 ± 0.30 |
| HMC | 1.39 ± 0.01 | 0.152 ± 0.009 | 0.290 ± 0.010 | 21.70 ± 0.81 |
| HMC | 0.92 | 0.077 | 0.356 | 22.46 |
| HMC-Washed | 0.76 | 0.072 | 0.151 | 22.00 |
| Fines | 9.31 ± 1.44 | 0.146 ± 0.225 | 0.428 ± 0.168 | 54.80 ± 5.97 |
| Fines-Dewatered | 49.28 | 0.07 | 0.273 | 50.60 |
| Fines | 10.50 | 0.050 | 0.594 | 60.10 |

FIG. 3b

APPARATUS AND METHOD FOR RECOVERING A HYDROCARBON DILUENT FROM TAILINGS

TECHNICAL FIELD

An apparatus and method for separating diluted tailings containing a hydrocarbon diluent into a recovered diluent component and a diluent recovered tailings component.

BACKGROUND OF THE INVENTION

Oil sand is essentially comprised of a matrix of bitumen, solid mineral material and water.

The bitumen component of oil sand includes hydrocarbons which are typically quite viscous at normal in situ temperatures and which act as a binder tot the other components of the oil sand. For example, bitumen has been defined by the United Nations Institute for Training and Research as a hydrocarbon with a viscosity greater than $10^4$ mPa s (at deposit temperature) and a density greater than $1000 \text{ kg/m}^3$ at 15.6 degrees Celsius.

The solid mineral material component of oil sand typically consists of sand, rock, silt and clay. Solid mineral material may be present in oil sand a coarse mineral material or fine mineral material. The accepted division between coarse mineral material and fine mineral material is typically a particle size of about 44 microns. Solid mineral material having a particle size greater than about 44 microns is typically considered to be coarse mineral material, while solid mineral material having a particle size less than about 44 microns is typically considered to be fine mineral material. Sand and rock are generally present in oil sand as coarse mineral material, while silt and clay are generally present in oil sand as fine mineral material.

A typical deposit of oil sand may contain (by weight) about 10 percent bitumen, up to about 6 percent water, with the remainder being comprised of solid mineral material, which may include a relatively small a mount of impurities such as humic matter and heavy minerals.

Water based technologies are typically used to extract bitumen from oil sand ore originating from the Athabasca area in northeastern Alberta, Canada. A variety of water based technologies exist, including the Clark "hot water" process and a variety of other processes which may use hot water, warm water or cold water in association with a variety of different separation apparatus.

In a typical water based oil sand extraction process, the oil sand ore is first mixed with water to form an aqueous slurry. The slurry is then processed to release bitumen from within the oil sand matrix and prepare the bitumen for separation from the slurry, thereby providing a conditioned slurry. The conditioned slurry is then processed in one or more separation apparatus which promote the formation of a primary bitumen froth while rejecting coarse mineral material and much of the fine mineral material and water. The separation apparatus may also produce a middlings stream from which a secondary bitumen froth may be scavenged. This secondary bitumen froth may be added to the primary bitumen froth or may be kept separate from the primary bitumen froth.

A typical bitumen froth (comprising a primary bitumen froth and/or a secondary bitumen froth) may contain (by weight) about 60 percent bitumen, about 30 percent water and about 10 percent solid mineral material, wherein a large proportion of the solid mineral material is fine mineral material.

The bitumen which is present in a typical bitumen froth is typically comprised of both non-asphaltenic material and asphaltenes.

This bitumen froth is typically subjected to a froth treatment process in order to reduce its solid mineral material and water concentration by separating the bitumen froth into a bitumen product and froth treatment tailings.

In a typical froth treatment process, the bitumen froth is diluted with a froth treatment diluent to provide a density gradient between the hydrocarbon phase and the water phase and to lower the viscosity of the hydrocarbon phase. The diluted bitumen froth is then subjected to separation in one or more separation apparatus in order to produce the bitumen product and the froth treatment tailings. Exemplary separation apparatus include gravity settling vessels, inclined plate separators and centrifuges.)

Some commercial froth treatment processes use naphthenic type diluents (defined as froth treatment diluents which consist essentially of or contain a significant amount of one or more aromatic compounds). Examples of naphthenic type diluents include toluene (a light aromatic compound) and naphtha, which may be comprised of both aromatic and non-aromatic compounds.

Other commercial froth treatment processes use paraffinic type diluents (defined as froth treatment diluents which consist essentially of or contain significant amounts of one or more relatively short-chained aliphatic compounds). Examples of paraffinic type diluents are C4 to C8 aliphatic compounds and natural gas condensate, which typically contains short-chained aliphatic compounds and may also contain small amounts of aromatic compounds.

Froth treatment processes which use naphthenic type diluents (i.e., naphthenic froth treatment processes) typically result m a relatively high bitumen recovery (perhaps about 98 percent), but also typically result in a bitumen product which has a relatively high solid mineral material and water concentration.

Froth treatment processes which use paraffinic type diluents (i.e., paraffinic froth treatment processes) typically result in a relatively lower bitumen recovery (in comparison with naphthenic froth treatment processes), and in a bitumen product which has a relatively lower solid mineral material and water concentration (in comparison with naphthenic froth treatment processes). Both the relatively lower bitumen recovery and the relatively lower solid mineral material and water concentration may be attributable to the phenomenon of asphaltene precipitation, which occurs in paraffinic froth treatment processes when the concentration of the paraffinic type diluent exceeds a critical level. This asphaltene precipitation results in bitumen being lost to the froth treatment tailings, but also provides a cleaning effect in which the precipitating asphaltenes trap solid mineral material and water as they precipitate, thereby separating the solid mineral material and the water from the bitumen froth.

Froth treatment tailings therefore typically contain solid mineral material, water, and an amount of residual bitumen (perhaps about 2-12 percent of the bitumen which was contained in the original bitumen froth, depending upon whether the froth treatment process uses a naphthenic type diluent or a paraffinic type diluent).

There are both environmental incentives and economic incentives for recovering all or a portion of the residual bitumen which is contained in froth treatment tailings.

In addition, the solid mineral material which is included in froth treatment tailings typically comprises an amount of heavy minerals. Heavy minerals are typically considered to be solid mineral material which has a specific gravity greater than that of quartz (i.e., a specific gravity greater than about 2.65). The heavy minerals in the solid mineral material which is typically contained in froth treatment tailings may include titanium metal minerals such as rutile ($TiO_2$), anatase ($TiO_2$), ilmenite ($FeTiO_3$) and leucoxene (typically an alteration product of ilmenite) and zirconium metal minerals such as zircon ($ZrSiO_4$). Titanium and zirconium bearing minerals are typically used as feedstocks for manufacturing engineered materials due to their inherent properties.

Although oil sand or may contain a relatively low concentration of heavy minerals, it is known that these heavy minerals tend to concentrate in the bitumen froth which is extracted from the oil sand ore, and therefore become concentrated in the froth treatment tailings which result from froth treatment processes, primarily as coarse mineral material. As a result, froth treatment tailings may typically contain a sufficient concentration of heavy minerals to provide an economic incentive to recover these heavy minerals from the froth treatment tailings.

Froth treatment tailings are therefore tailings which are derived from a bitumen froth treatment process. The prior art further includes processes for treating bitumen froth to recover heavy minerals therefrom and processes for treating froth treatment tailings to recover bitumen and/or heavy minerals therefrom. These processes are directed at the treatment of bitumen froth or components of bitumen froth and may therefore be described generally as bitumen froth treatment processes. In addition, these processes typically result in the production of tailings which may be described generally as tailings which are derived from a bitumen froth treatment process.

Canadian Patent No. 861,580 (Bowman) describes a process for the recovery of heavy metals from a primary bitumen froth. Canadian Patent No. 879,996 (Bowman) describes a process for the recovery of heavy metals from a secondary bitumen froth. Canadian Patent No. 927,983 (Penzes) describes a process for the recovery of heavy metal materials from primary bitumen froth. Canadian Patent No. 1,013,696 (Baillie et al) describes a process for producing from froth treatment tailings a quantity of heavy metal compounds such as titanium and zirconium minerals which are substantially free of bitumen and other hydrocarbon substances. Canadian Patent No. 1,076,504 (Kaminsky et al) describes a process for concentrating and recovering titanium and zirconium containing minerals from froth treatment tailings. Canadian Patent No. 1,088,883 (Trevoy et al) describes a dry separatory process for concentrating titanium-based and zirconium-based minerals from first stage centrifuge froth treatment tailings. Canadian Patent No. 1,326,571 (Ityokumbul et al) describes a process for recovering metal values such as titanium and zirconium from froth treatment tailings. Canadian Patent No. 2,426,113 (Reeves et al) describes a process for recovering heavy minerals from froth treatment tailings. Canadian Patent Application No. 2,548,006 (Erasmus et al) describes a process for recovering heavy minerals from froth treatment tailings.

Canadian Patent No. 1,081,642 (Porteous et al) and Canadian Patent No. 1,094,484 (Porteous et al) both describe processes for recovering bitumen from froth treatment tailings. Canadian Patent No. 1,238,597 (Seltzer) describes a process for the recovery of diluent and bitumen from the predominantly aqueous phase of electrostatically treated froth treatment tailings. Canadian Patent No. 1,252,409 (St. Amour et al) describes a method for recovering bitumen from a waste sludge obtained from a retention pond used to store tailings from water extraction of bitumen from tar sands.

Canadian Patent Application No. 2,682,109 (Stay et al) describes a method of extracting a hydrocarbon product from a hydrocarbon-containing stream which comprises adding a first solvent comprising an aromatic solvent to the stream to separate the stream in to a hydrocarbon layer and an aqueous layer, and adding a second solvent comprising a mixture of a polar solvent and a non-polar solvent to the hydrocarbon layer to separate the hydrocarbon product from the hydrocarbon layer.

Froth treatment tailings and other tailings which are derived from a bitumen froth treatment process may also contain an amount of a hydrocarbon diluent which has been used to facilitate the bitumen froth treatment process or processes. For example, a froth treatment diluent may be added to a bitumen froth to facilitate the separation of the bitumen froth into the bitumen product and the froth treatment tailings. Similarly, a hydrocarbon diluent may be added to froth treatment tailings and/or components of froth treatment tailings to facilitate the recovery of bitumen and/or heavy minerals therefrom. It is desirable to recover at least a portion of the hydrocarbon diluent from the tailings so that it can be reused.

Hydrocarbon diluent is typically recovered from froth treatment tailings in a naphtha recovery unit (NRU) in the case of naphthenic type diluents, or in a tailings solvent recovery unit (TSRU) in the case of paraffinic type diluents. Processes relating to the recovery of naphthenic type diluents and paraffinic type diluents from froth treatment tailings are known in the art.

Canadian Patent No. 1,027,501 (Simmer) describes a method for recovering hydrocarbon diluent from hot centrifuge tailings produced in the treatment of bitumen froth which comprises introducing the tailings into a vacuum flash vessel maintained at a sufficiently low sub-atmospheric pressure to vaporize the major portion of the contained diluent.

Canadian Patent No. 2,272,035 (Sarkar et al) describes a method for recovering hydrocarbon diluent from a slurry containing heavy oil, particulate solids, diluent and water which comprises introducing the slurry into a vacuum flash vessel chamber maintained at a sufficiently low sub-atmospheric pressure to vaporize diluent and water and introducing sufficient steam into a pool of residual slurry at the bottom of the chamber to vaporize residual diluent and water.

Canadian Patent No. 2,272,045 (King et al) describes a method for recovering hydrocarbon diluent from tailings produced in the treatment of bitumen froth which comprises introducing the froth treatment tailings into a steam stripping vessel maintained at near atmospheric pressure (the vessel having a plurality of interior, vertically spaced shed decks), evenly distributing the froth treatment tailings over the shed decks to maximize the surface area of the froth treatment tailings, and introducing steam below the shed decks so that it flows countercurrently to the froth treatment tailings and heats the froth treatment tailings to vaporize the hydrocarbon diluent and some water.

Canadian Patent No. 2,353,109 (Foulds et al) describes a process for treating an underflow stream from a last separation step in a paraffinic solvent process for separating bitumen from an oil sands froth which comprises introducing the stream to a solvent recovery vessel that is substantially free of internals and wherein the temperature and pressure are such that the solvent is normally a vapour, maintaining a pool of liquid and solids in the lower part of the vessel at a controlled level for sufficient time to allow the solvent to vapourize, and agitating the pool to a level of agitation where the asphaltenes are dispersed, submerged and re-agglomeration of asphaltenes is inhibited and the solids are maintained in suspension.

Canadian Patent No. 2,587,166 (Sury), Canadian Patent No. 2,613,873 (Sury) and Canadian Patent No. 2,614,669 (Sury) each describe processes for recovering paraffinic solvent from froth treatment tailings which comprises introducing the froth treatment tailings into a tailings solvent recovery unit (TSRU) and introducing inert gas or steam into the TSRU in order to vaporize at least a portion of the paraffinic solvent. In some embodiments, the TSRU contains internals and the inert gas or steam is introduced into the TSRU below the internals. In some embodiments, the TSRU is substantially free of internals and the inert gas or steam is introduced into a liquid pool which is formed in the bottom of the TSRU. In some embodiments, tailings from the TSRU are fed into a second TSRU which is maintained at an absolute pressure which is lower than the first TSRU. In some embodiments, the absolute pressure in the first TSRU is between 100 and 200 kPa and the absolute pressure in the second TSRU is between 20 and 200 kPa. In some embodiments, the froth treatment tailings contain asphaltenes and the paraffinic solvent is vaporized from asphaltene agglomerates.

Canadian Patent Application No. 2,651,155 (Sury et al) describes a method of recovering hydrocarbons from bitumen froth which comprises passing froth treatment tailings to a tailings solvent recovery unit (TSRU) and optionally to a second TSRU, and a third TSRU, wherein the operating pressure in each TSRU is lower than the operating pressure in the preceding TSRU.

Canadian Patent Application No. 2,454,942 (Grant et al) describes a process for separating a diluted tailings into a recovered solvent component and a solvent recovered tailings component which comprises discharging and returning a portion of the solvent recovered tailings component to the solvent recovery apparatus as a returned solvent recovered tailings component.

Canadian Patent Application No. 2,173,559 (Scheybeler) and U.S. Pat. No. 6,712,215 (Scheybeler) each describe a method of recovering solvent from oil sand tailings which comprises directing a stream of tailings and saturated steam through a nozzle and discharging the combined stream of tailings and saturated steam against an impaction target

SUMMARY OF THE INVENTION

References in this document to orientations, to operating parameters, to ranges, to lower limits of ranges, and to upper limits of ranges are not intended to provide strict boundaries for the scope of the invention, but should be construed to mean "approximately" or "about" or "substantially", within the scope of the teachings of this document, unless expressly stated otherwise.

In this document, "bitumen froth treatment process" includes processes for treating a bitumen froth and processes for treating one or more components of a bitumen froth.

In this document, "coarse mineral material fraction" means a component of froth treatment tailings which comprises a minimal amount of solid mineral material having a particle size less than about 44 microns.

In this document, "diluted tailings" means tailings containing an amount of a hydrocarbon diluent which result from a bitumen froth treatment process for the treatment of a bitumen froth and/or the treatment of one or more components of a bitumen froth.

In this document, "fine mineral material fraction" means a component of froth treatment tailings which comprises a minimal amount of solid mineral material having a particle size greater than or equal to about 44 microns.

In this document, "froth treatment tailings" means tailings which are produced by a bitumen froth treatment process.

In this document, "heavy mineral concentrate" means a component of froth treatment tailings into which heavy minerals have been concentrated in a process for treating froth treatment tailings.

In this document, "hydrocarbon diluent" means any substance containing one or more hydrocarbon compounds and/or substituted hydrocarbon compounds which is suitable for use for diluting and/or dissolving bitumen in a bitumen froth treatment process.

In this document, "naphthenic type diluent" means a hydrocarbon diluent which includes a sufficient amount of one or more aromatic compounds so that the diluent essentially exhibits the properties of a naphthenic type diluent as recognized in the art, as distinguished from a paraffinic type diluent. In this document, a naphthenic type diluent may therefore be comprised of a mixture of aromatic and non-aromatic compounds, including but not limited to such substances as naphtha and toluene.

In this document, "naphthenic froth treatment process" means a bitumen froth treatment process which uses a sufficient amount of one or more naphthenic type diluents so that the bitumen froth treatment process is recognized in the art as a naphthenic froth treatment process as distinguished from a paraffinic froth treatment process.

In this document, "paraffinic type diluent" means a hydrocarbon diluent which includes a sufficient amount of one or more relatively short-chain aliphatic compounds (such as, for example, C5 to C8 aliphatic compounds) so that the diluent essentially exhibits the properties of a paraffinic type diluent as recognized in the art, as distinguished from a naphthenic type diluent. In this document, a paraffinic type diluent may therefore be comprised of a mixture of aliphatic and non-aliphatic compounds, including but not limited to such substances as natural gas condensate.

In this document, "paraffinic froth treatment process" means a bitumen froth treatment process which uses a sufficient amount of one or more paraffinic type diluents so that the bitumen froth treatment process is recognized in the art as a paraffinic froth treatment process as distinguished from a naphthenic froth treatment process.

The present invention is directed at an apparatus and a method for separating diluted tailings containing a hydrocarbon diluent into a recovered diluent component and a diluent recovered tailings component.

The diluted tailings result from a bitumen froth treatment process for the treatment of a bitumen froth and/or for the treatment of one or more components of a bitumen froth. Consequently, the diluted tailings are derived from a bitumen froth treatment process. In seine embodiments, the diluted tailings may be comprised of, may consist of, or may consist essentially of froth treatment tailings. In some embodiments, the diluted tailings may be comprised of, may consist of, or may consist essentially of a coarse mineral material fraction of froth treatment tailings. In some embodiments, the diluted tailings may be comprised of, may consist of, or may consist essentially of a fine mineral material fraction of froth treatment tailings.

The diluted tailings may therefore be comprised of solid mineral material and water, and may be comprised of an amount of residual bitumen. The diluted tailings are further comprised of an amount of a hydrocarbon diluent.

In some embodiments, the method of the invention may be comprised of providing a tailings pool containing the diluted tailings, introducing an amount of steam directly into the tailings pool, mixing the diluted tailings which are contained in the tailings pool, and providing a suitable residence time for the diluted tailings so that an equilibrium state can be achieved or approached amongst the liquid and vapour phases of the components of the diluted tailings and the steam, thereby enabling the recovery of recovered diluent component.

In some embodiments, the apparatus of the invention may be comprised of a diluent recovery vessel having a tailings pool section, a steam distributor located in the tailings pool section of the diluent recovery vessel, and a mixing device associated with the tailings pool section, for mixing diluted tailings which form a tailings pool in the tailings pool section.

In an exemplary method aspect, the invention is a method of separating a diluted tailings comprising a hydrocarbon diluent into a recovered diluent component and a diluent recovered tailings component, wherein the diluted tailings are derived from a bitumen froth treatment process, the method comprising:
 (a) introducing the diluted tailings into an interior of a diluent recovery vessel so that the diluted tailings form a tailings pool in a tailings pool section of the diluent recovery vessel;
 (b) introducing an amount of steam directly into the tailings pool;;
 (c) mixing the diluted tailings which are contained in the tailings pool;
 (d) maintaining the diluted tailings in the diluent recovery vessel for a residence time in order to separate the diluted tailings into the recovered diluent component and the diluent recovered tailings component;
 (e) recovering the recovered diluent component from the diluent recovery vessel; and
 (f) recovering the diluent recovered tailings component from the diluent recovery vessel.

In an exemplary apparatus aspect, the invention is an apparatus for separating a diluted tailings comprising a hydrocarbon diluent into a recovered diluent component and a diluent recovered tailings component wherein the diluted tailings are derived from a bitumen froth treatment process, the apparatus comprising:
 (a) a diluent recovery vessel having a lower end, an upper end, an interior, and a tailings pool section at the lower end of the interior of the diluent recovery vessel;
 (b) a diluted tailings inlet for introducing the diluted tailings into the interior of he diluent recovery vessel;
 (c) a recovered diluent component outlet at the upper end of the diluent recovery vessel for recovering the recovered diluent component from the diluent recovery vessel;
 (d) a diluent recovered tailings component outlet at the lower end of the diluent recovery vessel for recovering the diluent recovered tailings component from the diluent recovery vessel;
 (e) a steam distributor located in the tailings pool section of the diluent recovery vessel; and
 (f) a mixing device associated with the tailings pool section of the diluent recovery vessel, for mixing the diluted tailings which form a tailings pool in the tailings pool section of the diluent recovery vessel.

In some embodiments, the method of the invention may be performed using the exemplary apparatus of the invention as described above. In some embodiments, the method of the invention may be performed using an apparatus which is different from the exemplary apparatus of the invention as described above.

The diluent recovery vessel may have any shape and/or size which is suitable for separating the diluted tailings into the recovered diluent component and the solvent recovered tailings component. In some embodiments, the interior of the diluent recovery vessel may be comprised of a horizontal column having a ratio of vertical dimension to horizontal dimension which is less than about 1:1. In some embodiments, the interior of the diluent recovery vessel may be comprised of a vertical column having a ratio of vertical dimension to horizontal dimension which is greater than or equal to about 1:1.

The tailings pool section of the diluent recovery vessel may be defined by any portion of the interior of the diluent recovery vessel. In some embodiments, the tailings pool section may be located at or adjacent to the lower end of the diluent recovery vessel so that the diluted tailings form a tailings pool at or adjacent to the lower end of the diluent recovery vessel.

In some embodiments, the diluent recovery vessel may be comprised of internal structures for increasing the distribution and surface area of the diluted tailings in the interior of the diluent recovery vessel. In some embodiments, the internal structures may be comprised of shed decks. In some embodiments, the internal structures may be located between the diluted tailings inlet and the tailings pool section of the diluent recovery vessel.

In some embodiments, the diluent recovery vessel may be free or substantially free of internal structures.

The method of the invention may be performed at any operating pressure which is suitable for separating the diluted tailings into the recovered diluent component and the diluent recovered tailings component. In some embodiments, the method of the invention may be performed at an operating pressure which is sub-atmospheric or slightly above atmospheric pressure. In some embodiments, the method of the invention may be performed at an absolute pressure of between about 20 kPa (about 3 psia) and about 120 kPa (about 17 psia) as the operating pressure. In some embodiments, the operating pressure of the method may be achieved by maintaining the interior of the diluent recovery vessel at the operating pressure.

The method of the invention may be performed at any operating temperature which is suitable for separating the diluted tailings into the recovered diluent component and the diluent recovered tailings component. In some embodiments, the method of the invention may be performed at an operating temperature which is between about 40 degrees Celsius and about 120 degrees Celsius. In some embodiments, the operating temperature of the method may be achieved by maintaining the interior of the diluent recovery vessel at the operating temperature.

The hydrocarbon diluent may be comprised of, may consist of, or may consist essentially of any type of hydrocarbon diluent as defined herein.

In some embodiments, the hydrocarbon diluent may be comprised of, may consist of, or may consist essentially of a naphthenic type diluent. In some embodiments, the hydrocarbon diluent may be comprised of, may consist of, or may consist essentially of a paraffinic type diluent. In some embodiments, the hydrocarbon diluent may be comprised of a combination of one or more naphthenic type diluents and/or one or more paraffinic type diluents.

In some embodiments in which the hydrocarbon diluent is comprised of, consists of, or consists essentially of a naphthenic type diluent, the method of the invention may be performed at an absolute pressure of between about 30 kPa (about 4 psia) and about 120 kPa (about 17 psia) as the operating pressure, and the method may be performed at an operating temperature of between about 60 degrees Celsius and about 120 degrees Celsius.

In some embodiments in which the hydrocarbon diluent is comprised of, consists of, or consists essentially of a paraffinic type diluent, the method of the invention may be performed at an absolute pressure of between about 20 kPa (about 3 psia) and about 110 kPa (about 16 psia) as the operating pressure, and the method may be performed at an operating temperature of between about 40 degrees Celsius and about 70 degrees Celsius.

The method of the invention may be performed as a batch method or as a continuous method. In some embodiments, the diluted tailings may be introduced into the diluent recovery vessel at a feed rate by weight of the diluted tailings. In some embodiments, the feed rate of the diluted tailings may be dependent upon the desired residence time of the diluted tailings in the diluent recovery vessel.

The diluted tailings may be introduced into the interior of the diluent recovery vessel at any location in the diluent recovery vessel and in any manner. In some embodiments, the diluted tailings may be introduced into the interior of the diluent recovery vessel via a diluted tailings inlet. In some embodiments, the diluted tailings may be introduced into the interior of the diluent recovery vessel at a diluted tailings inlet which is located at or adjacent to the upper end of the diluent recovery vessel.

In some embodiments, the diluted tailings may be introduced into the interior of the diluent recovery vessel by distributing the diluted tailings throughout the diluent recovery vessel. In some embodiments, the diluted tailings may be introduced into the interior of the diluent recovery vessel by distributing the diluted tailings throughout the diluent recovery vessel at a location which is located at or adjacent to the upper end of the diluent recovery vessel. In some embodiments, the diluted tailings may be distributed throughout the diluent recovery vessel by a tailings distributor which is located in the interior of the diluent recovery vessel and which is associated with the diluted tailings inlet.

In some embodiments in which the diluent recovery vessel is comprised of internal structures, the internal structures may be located between the diluted tailings inlet and the tailings pool section of the diluent recovery vessel.

The steam may be introduced into the tailings pool section of the diluent recovery vessel and directly into the tailings pool in any manner which is suitable for exposing the diluted tailings to the steam. In some embodiments, introducing the steam directly into the tailings pool may be comprised of distributing the steam throughout the tailings pool with a steam distributor which is located in the tailings pool. In some embodiments, the steam distributor may be configured so that the steam is introduced directly into the tailings pool in a direction toward the lower end of the diluent recovery vessel.

The steam may be introduced into the diluent recovery vessel at any steam addition rate by weight of the steam which is suitable for separating the diluted tailings into the recovered diluent component and the diluent recovered tailings component. In some embodiments, the steam addition rate may be dependent upon the feed rate of the diluted tailings into the diluent recovery vessel. In some embodiments, the steam addition rate may be between about 3 percent and about 100 percent of the feed rate of the diluted tailings. In some embodiments, the steam addition rate may be between about 3 percent and about 40 percent of the feed rate. In some embodiments, the steam addition rate may be between about 5 percent and about 30 percent of the feed rate. In some embodiments, the steam addition rate may be between about 5 percent and about 15 percent of the feed rate. In some embodiments, the steam addition rate may be between about 5 percent and about 10 percent of the feed rate.

The recovered diluent component may be recovered from the diluent recovery vessel at any location in the diluent recovery vessel and in any manner. In some embodiments, the recovered diluent component may be recovered from the diluent recovery vessel via a recovered diluent component outlet. In some embodiments, the recovered diluent component may be recovered from the diluent recovery vessel via a recovered diluent component outlet which is located at or adjacent to the upper end of the diluent recovery vessel. In some embodiments, the recovered diluent component may be recovered from the diluent recovery vessel by venting the recovered diluent component from the diluent recovery vessel.

In some embodiments, the recovered diluent component which is recovered from the diluent recovery vessel may be further treated in order to condense the recovered diluent component and/or in order to reduce the amount of water and other impurities which may be contained in the recovered diluent component. In some embodiments, the recovered diluent component or the further treated recovered diluent component may be recycled for use in a bitumen froth treatment process.

The diluent recovered tailings component may be recovered from the diluent recovery vessel in any manner. In some embodiments, the diluent recovered tailings component may be recovered from the diluent recovery vessel via a diluent recovered tailings component outlet which is located at or adjacent to the lower end of the diluent recovery vessel and which is in communication with the tailings pool section of the diluent recovery vessel. In some embodiments, the diluent recovered tailings component may be recovered from the diluent recovery vessel at the diluent recovered tailings component outlet by draining, pumping, augering or otherwise withdrawing the diluent recovered tailings component from the diluent recovery vessel via the diluent recovered tailings component outlet.

In some embodiments, the diluent recovered tailings component may be further treated in order to reduce the amount of water and other impurities which may be contained in the diluent recovered tailings component and/or in order to recover additional bitumen, heavy minerals, or other substances therefrom. In some embodiments, the diluent recovered tailings component or the further treated diluent recovered tailings component may be disposed of in a similar manner as other tailings which result from the processing of oil sand.

The residence time of the diluted tailings in the diluent recovery vessel may be any residence time which is suitable for achieving or approaching an equilibrium state amongst the liquid and vapour phases of the components of the diluted tailings and the steam.

In some embodiments, the residence time may be dependent upon the composition of the diluted tailings. In some embodiments, the residence time may increase as the amount of solid mineral material having a particle size less than about 44 microns which is present in the diluted tailings increases. It is theorized that this phenomenon may be due to increased surface area and porosity which may be associated with solid mineral material having a particle size less than about 44 microns.

In some embodiments, the residence time may be dependent upon the hydrocarbon diluent content of the diluted tailings (i.e., the concentration of hydrocarbon diluent in the diluted tailings). In some embodiments, the residence time may increase as the hydrocarbon diluent content of the diluted tailings increases. It is theorized that this phenomenon may be due to mass transfer considerations relating to the hydrocarbon diluent.

In some embodiments, the residence time may be dependent upon both the composition of the diluted tailings and upon the hydrocarbon diluent content of the diluted tailings. In some embodiments, the hydrocarbon diluent content of the diluted tailings may tend to increase as the amount of solid mineral material having a particle size less than about 44 microns which is present in the diluted tailings increases. It is theorized that this phenomenon may be due to the increased surface area and porosity which may be associated with solid mineral material having a particle size less than about 44 microns, which may provide an increased capability of the solid mineral material to absorb and/or adsorb the hydrocarbon diluent.

In some embodiments, the residence time may be dependent upon the steam addition rate, and for upon the mixing intensity.

In some embodiments, the residence time may be dependent upon a combination of factors including but not limited to the composition of the diluted tailings, the hydrocarbon diluent content of the diluted tailings, the steam addition rate, and/or the mixing intensity.

In some embodiments, the residence time may be between about 1 minute and about 50 minutes. In some embodiments, the residence time may be between about 5 minutes and about 50 minutes.

In some embodiments in which the diluted tailings may be comprised of, may consist of, or may consist essentially of a coarse mineral material fraction of froth treatment tailings, the residence time may be between about 5 minutes and about 20 minutes. In some embodiments in which the diluted tailings have a hydrocarbon diluent content of less than about 3 percent by weight of the diluted tailings, the residence time may be between about 5 minutes and about 20 minutes.

In some embodiments in which the diluted tailings may be comprised of may consist of, or may consist essentially of a fine mineral material fraction of froth treatment tailings, the residence time may be between about 5 minutes and about 50 minutes. In some embodiments in which the diluted tailings have a hydrocarbon diluent content which is greater than about 3 percent by weight of the diluted tailings, the residence time may be between about 5 minutes and about 50 minutes.

The diluted tailings may be mixed in the tailings pool in any manner using any structure, device or apparatus which is suitable for mixing the diluted tailings. In some embodiments, mixing the diluted tailings in the tailings pool may be performed using a combination of methods and/or techniques and/or may be performed using a combination of structures, devices or apparatus.

In some embodiments, mixing the diluted tailings may be comprised of stirring the diluted tailings. In some embodiments, stirring the diluted tailings may be comprised of rotating a stirrer in the tailings pool. The stirrer may be comprised of any structure, device or apparatus which is capable of stirring the diluted tailings.

Stiffing the diluted tailings may be performed at any stirring intensity which is suitable for mixing the diluted tailings. In some embodiments, stirring the diluted tailings may be performed at a stirring intensity of between about 0.05 watts per kilogram of the diluted tailings and about 40 watts per kilogram of the diluted tailings. In some embodiments, stirring the diluted tailings may be performed at a stirring intensity of between about 1.5 watts per kilogram of the diluted tailings and about 10 watts per kilogram of the diluted tailings.

In some embodiments, mixing the diluted tailings may be comprised of passing at least a portion of the diluted tailings from the tailings pool through a recirculation circuit which is in communication with the interior of the diluent recovery vessel so that the portion of the diluted tailings is recirculated back to the interior of the diluent recovery vessel as recirculated tailings. In some embodiments, the recirculation circuit may be in communication with the tailings pool so that the recirculated tailings are recirculated back to the tailings pool. In some embodiments, the recirculation circuit may be in communication with the interior of the diluent recovery vessel above the tailings pool so that the recirculated tailings are recirculated back to the interior of the diluent recovery vessel above the tailings pool. In some embodiments, the recirculation circuit may be in communication with both the tailings pool and the interior of the diluent recovery vessel above the tailings pool so that the recirculated tailings are recirculated back to both the tailings pool and the interior of the diluent recovery vessel above the tailings pool.

In some embodiments, the recirculation circuit may be associated with the diluent recovered tailings component outlet so that the recirculated tailings may be comprised of consist of, or consist essentially of the diluent recovered tailings component.

In some embodiments, the recirculation circuit may be comprised of a pump for passing the recirculated tailings through the recirculation circuit.

In some embodiments, at least a portion of the recirculated tailings may be recirculated back to the interior of the diluent recovery vessel above the tailings pool so that they impinge upon a recirculation disperser located in the interior of the diluent recovery vessel above the tailings pool.

The recirculation disperser may be comprised of any structure, device or apparatus which is suitable for dispersing the recirculated tailings. In some embodiments, the recirculation disperser may be comprised of a recirculation stirrer. In some embodiments, the recirculation stirrer may be similar to the stirrer which is located in the tailings pool.

The recirculated tailings may be passed through the recirculation circuit at any recirculation rate by weight which is suitable for mixing the recirculated tailings. In some embodiments, the recirculation rate may be between about 1 percent and about 2000 percent of the feed rate. In some embodiments, the recirculation rate may be between about 5 percent and about 100 percent of the feed rate. In some embodiments, the recirculation rate may be between about 25 percent and about 100 percent of the feed rate. In some embodiments, the recirculation rate may be between about 25 percent and about 50 percent of the feed rate.

In some embodiments, mixing the diluted tailings in the tailings pool may be comprised of both stirring the diluted tailings in the tailings pool and passing at least a portion of the diluted tailings from the tailings pool through the recirculation circuit.

In some embodiments, mixing the diluted tailings in the tailings pool may assist in distributing the steam throughout the tailings pool by breaking the steam into smaller droplets and/or dispersing the steam throughout the diluted tailings.

In some embodiments, mixing the diluted tailings by recirculating at least a portion of the diluted tailings from the tailings pool through a recirculation circuit which is in communication with the interior of the diluent recovery vessel above the tailings pool may assist in increasing the surface area of the diluted tailings and thereby potentially enhance the separation of the diluted tailings, and may reduce the distance that the diluent must travel within the diluent recovery vessel in order to join the vapour phase.

In some embodiments, the method of the invention may be further comprised of providing a foam breaking device in the interior of the diluent recovery vessel and the apparatus of the invention may be further comprised of a foam breaking device located in the interior of the diluent recovery vessel. In some embodiments, the foam breaking device may be located between the tailings pool and the upper end of the diluent recovery vessel. In some embodiments, the foam breaking device may be located between the tailings pool and the diluted tailings inlet. In some embodiments, the foam breaking device may be located between the tailings pool and the recovered diluent component outlet.

The foam breaking device may be comprised of any structure, device or apparatus or combination of structures, devices or apparatus which is capable of breaking, dissipating, reducing and/or dispersing foam which may be formed from the diluted tailings and the steam in the tailings pool. In some embodiments, the foam breaking device may be comprised of a foam breaker.

In some embodiments, the foam breaker may be comprised of a structure, device or apparatus which has a foam breaker axis and which is rotatable about the foam breaker axis. In some embodiments, the interior of the diluent recovery vessel may define a vessel axis, and the foam breaker axis may be substantially parallel with the vessel axis. In some embodiments, the foam breaker axis may be coincident with the vessel axis. In some embodiments, the foam breaker may be comprised of a brush which is rotatable in the interior of the diluent recovery vessel about the foam breaker axis.

In some embodiments, the foam breaker may assist in dispersing the diluted tailings and/or breaking the diluted tailings into smaller droplets as the diluted tailings pass through the diluent recovery vessel from the diluted tailings inlet toward the tailings pool. In some embodiments, the foam breaker may also provide an increased surface area for the diluted tailings to contact as the diluted tailings pass through the diluent recovery vessel, which may enhance the heat and mass transfer characteristics of the diluent recovery vessel.

In some embodiments in which the mixing device is comprised of a stirrer, the stirrer may be rotatable in the tailings pool section and the tailings pool about a stirrer axis which is substantially parallel with the vessel axis. In some embodiments, the stirrer axis may be coincident with the vessel axis. In some embodiments, the stirrer axis may be coincident with the foam breaker axis.

In some such embodiments, the foam breaker and the stirrer may both be mounted on a stirring shaft, the stirring shaft may have a stirring shaft axis which is coincident with the foam breaker axis and the stirrer axis, and the stirring shaft may be rotatable in order to rotate both the foam breaker and the stirrer. In some such embodiments, the stirring shaft may be driven by a stirring motor.

In some embodiments in which the recirculation disperser is provided, the recirculation disperser may be comprised of the stirring shaft. In some embodiments in which the recirculation disperser is provided, the recirculation disperser may be comprised of a recirculation stirrer. In some embodiments, the recirculation disperser may be comprised of the stirring shaft and the recirculation stirrer. In some embodiments, the recirculation stirrer may be mounted on the stirring shaft so that rotation of the stirring shaft rotates the recirculation stirrer.

In some such embodiments, the foam breaker, the stirrer and/or the recirculation stirrer may be independently rotatable by being mounted on different shafts and/or by being driven by different motors.

In some embodiments, the foam breaking device may be comprised of an increased horizontal dimension in the interior of the diluent recovery vessel and/or an increased cross-sectional area in the interior of the diluent recovery vessel, relative to one or more other sections of the diluent recovery vessel.

In some such embodiments, the tailings pool section and thus the tailings pool may have a tailings pool horizontal dimension and the foam breaking device may be comprised of a foam breaking horizontal dimension, wherein the foam breaking horizontal dimension is larger than the tailings pool horizontal dimension.

In some such embodiments, the tailings pool section and thus the tailings pool may have a tailings pool cross-sectional area transverse to the vessel axis in the interior of the diluent recovery vessel and the foam breaking device may be comprised of a foam breaking cross-sectional area transverse to the vessel axis in the interior of the diluent recovery vessel, wherein the foam breaking cross-sectional area is larger than the tailings pool cross-sectional area.

In some such embodiments, the ratio of the foam breaking horizontal dimension to the tailings pool horizontal dimension may be between about 1.2:1 and about 2.5:1. In some such embodiments, the ratio of the foam breaking cross-sectional area to the tailings pool cross-sectional area may be between about 1.4:1 and about 6.25:1.

In some such embodiments, the foam breaking horizontal dimension and/or the foam breaking cross-sectional area may extend over an isolated section of the interior of the diluent recovery vessel. In some such embodiments, the foam breaking horizontal dimension and/or the foam breaking cross-sectional area may extend over the entire vertical dimension of the interior of the diluent recovery vessel with the exception of the tailings pool section.

BRIEF DESCRIPTION OF DRAWINGS

Embodiments of the invention will now be described with reference to the accompanying drawings, in which:

FIG. 3 is a table presenting data from bench scale experimental testing of an embodiment of the method of the invention, in which the diluted tailings consist of either a heavy mineral concentrate obtained from froth treatment tailings, a washed heavy mineral concentrate, a fine mineral material fraction obtained from froth treatment tailings, or a dewatered fine mineral material fraction.

DETAILED DESCRIPTION

The present invention is directed at an apparatus and a method for separating a diluted tailings into a recovered diluent component and a diluent recovered tailings component.

Figure 1:
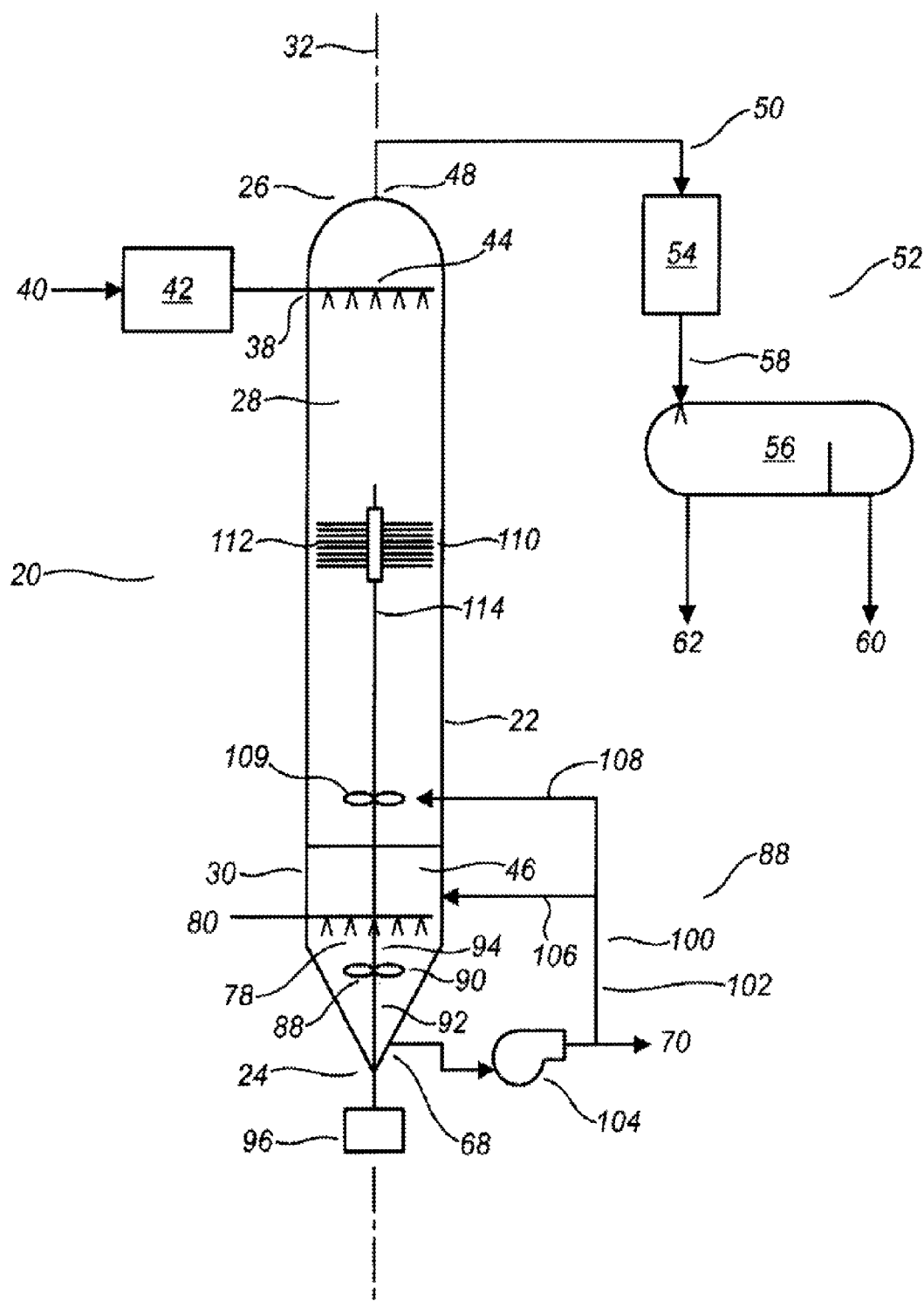
FIG. 1 is a schematic drawing of a first exemplary embodiment of an apparatus according to the invention.
Figure 2:
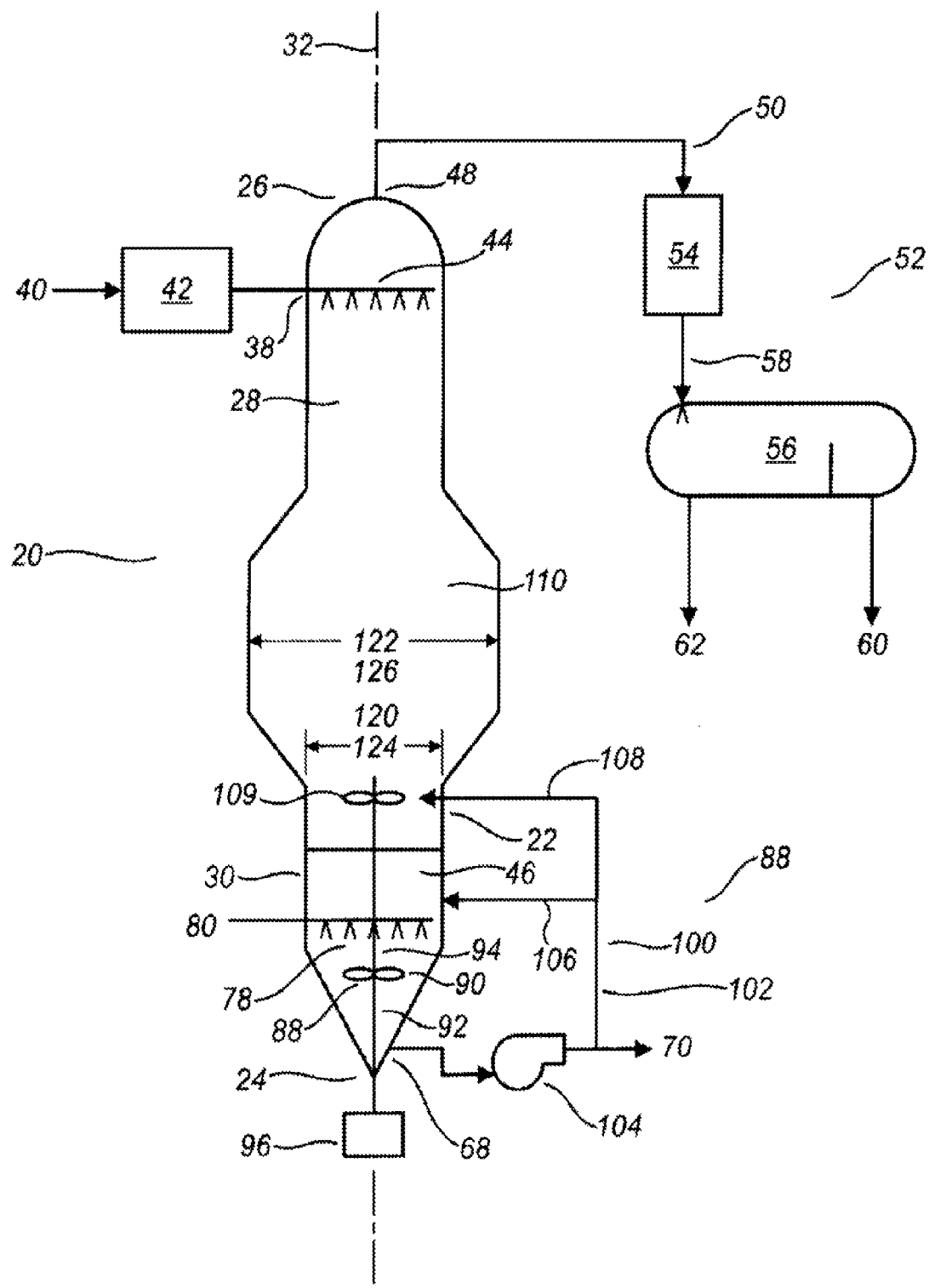
FIG. 2 is a schematic drawing of a second exemplary embodiment of an apparatus according to the invention.

FIG. 1 provides a schematic drawing of a first exemplary embodiment of an apparatus according to the invention. FIG. 2 provides a schematic drawing of a second exemplary embodiment of an apparatus according to the invention. The apparatus depicted in FIG. 1 and FIG. 2 are examples of apparatus which may be used to perform the method of the invention Referring to FIG. 1 and FIG. 2, there is depicted an apparatus (20) for separating a diluted tailings into a recovered diluent component and a diluent recovered tailings component.

The apparatus (20) is comprised of a diluent recover vessel (22). As depicted in FIG. 1 and FIG. 2, the diluent recovery vessel (22) has a lower end (24), an upper end (26), an interior (28) and a tailings pool section (30) at the lower end (24) of the interior (28) of the diluent recovery vessel (22). The interior (28) of the diluent recovery vessel (22) defines a vessel axis (32).

As depicted in FIG. 1 and FIG. 2, the interior (28) of the diluent recovery vessel (22) is comprised of a vertical column so that the vertical dimension of the interior (28) of the diluent recovery vessel (22) is greater than or equal to the horizontal dimension of the interior (28) of the diluent recovery vessel (22). As depicted in FIG. 1 and FIG. 2, the ratio of the vertical dimension of the interior (28) of the diluent recovery vessel (22) to the horizontal dimension of the interior (28) of the diluent recovery vessel (22) is between about 5:1 and about 6:1.

The apparatus is further comprised of a diluted tailings inlet (38) for introducing diluted tailings (40) into the interior (28) of the diluent recovery vessel (22). As depicted in FIG. 1 and FIG. 2, the diluted tailings inlet (38) is located adjacent to the upper end (26) of the diluent recovery vessel (22). The diluted tailings inlet (38) is in communication with a source (not shown) of the diluted tailings (40).

The diluted tailings (40) are tailings which are derived from a bitumen froth treatment process, and may be comprised of, may consist of, or may consist essentially of froth treatment tailings, a fine mineral material fraction of froth treatment tailings, a coarse mineral material fraction of froth treatment tailings, a heavy mineral concentrate produced from froth treatment tailings, and/or any other tailings which are derived from froth treatment tailings.

The diluted tailings (40) are therefore typically comprised of solid mineral material, water, and an amount of residual bitumen. The diluted tailings (40) are further comprised of an amount of a hydrocarbon diluent such as, for example, a naphthenic type diluent and/or a paraffinic type diluent.

A diluted tailings heater (42) is interposed between the source of the diluted tailings (40) and the diluted tailings inlet (38). The diluted tailings heater (42) transfers heat to the diluted tailings (40) in order to raise the temperature of the diluted tailings (40) to a desired feed temperature. The desired feed temperature of the diluted tailings (40) depends upon the composition of the diluted tailings (40), including the composition of the hydrocarbon diluent which is included in the diluted tailings (40).

The diluted tailings inlet (38) is connected or otherwise associated with a tailings distributor (44) which is located in the interior (28) of the diluent recovery vessel (22). The tailings distributor (44) distributes the diluted tailings (40) throughout the interior (28) of the diluent recovery vessel (22).

The diluted tailings (40) move downward through the interior (28) of the diluent recovery vessel (22) from the tailings distributor (44) and form a tailings pool (46) in the tailings pool section (30) of the diluent recovery vessel (22).

As depicted in FIG. 1 and FIG. 2, the diluent recovery vessel (22) is substantially free of internal structures (not shown) such as shed decks or other structures for increasing the distribution and the surface area of the diluted tailings in the interior (28) of the diluent recovery vessel (22). It is believed that internal structures will not normally be required in the diluent recovery vessel (22) in the practice of the invention. If, however, internal structures are provided in the apparatus (20), they may typically be provided between the diluted tailings inlet (38) and the tailings pool section (30) of the diluent recovery vessel (22).

The apparatus (20) is further comprised of a recovered diluent component outlet (48) for recovering a recovered diluent component (50) from the diluent recovery vessel (22). As depicted in FIG. 1 and FIG. 2, the recovered diluent component outlet (48) is located at the upper end (26) of the diluent recovery vessel (22). The recovered diluent component outlet (48) is in communication with a condensing apparatus (52).

As depicted in FIG. 1 and FIG. 2, the condensing apparatus (52) is comprised of a condenser (54) and a liquid separator vessel (56). Heat is removed from the recovered diluent component (50) in the condenser (54) in order to produce a condensed recovered diluent component (58). The condensed recovered diluent component (58) is separated in the liquid separator vessel (56) into recovered hydrocarbon diluent (60) and recovered water (62).

The apparatus (20) is further comprised of a diluent recovered tailings component outlet (68) for recovering a diluent recovered tailings component (70) from the diluent recovery vessel (22). As depicted in FIG. 1 and FIG. 2, the diluent recovered tailings component outlet (68) is located at the lower end (24) of the diluent recovery vessel (22) at the bottom of the tailings pool section (30) of the diluent recovery vessel (22). The diluent recovered tailings component (70) may be recovered from the diluent recovery vessel (22) via the diluent recovered tailings component outlet (68) by draining, pumping, augering or otherwise withdrawing the diluent recovered tailings component (70).

The apparatus (20) is further comprised of a steam distributor (78) located in the tailings pool section (30) of the diluent recovery vessel (22) for introducing an amount of steam (80) directly into the tailings pool section (30) of the diluent recovery vessel (22). The steam distributor (78) distributes the steam (80) throughout the tailings pool section (30) of the diluent recovery vessel (22).

As depicted in FIG. 1 and FIG. 2, the steam distributor (78) may be comprised of a sparger ring, a fritted material or other suitable structure, device or apparatus which provides an array of apertures (not shown) for distributing the steam (80) throughout the tailings pool section (30). In order to minimize the likelihood of plugging of the apertures due to the movement of the diluted tailings (40) downward in the tailings pool section (30), the steam distributor (78) may be configured to introduce the steam (80) into the tailings pool section (30) of the diluent recovery vessel (22) in a direction toward the lower end (24) of the diluent recovery vessel (22) by locating the apertures on a lower side of the steam distributor (78).

The steam distributor (78) is in communication with a source (not shown) of the steam (80). The source of the steam (80) may be comprised of a heater (not shown) or a boiler (not shown) for heating water to produce the steam (80).

The apparatus (20) is further comprised of a mixing device (88) associated with the tailings pool section (30) of the diluent recovery vessel (22), for mixing the diluted tailings (40) which form the tailings pool (46) in the tailings pool section (30) of the diluent recover vessel (22).

As depicted in FIG. 1 and FIG. 2, the mixing device (88) is comprised of a stirrer (90) which is located in the tailings pool section (30) of the diluent recovery vessel (22). The stirrer (90) is mounted on a stirring shaft (92) which provides a stirrer axis (94) for the stirrer (90). As depicted in FIG. 1 and FIG. 2, the stirrer axis (94) is substantially parallel with the vessel axis (32) and is also substantially coincident with the vessel axis (32). The stirring shaft (92) is rotatable so that the stirrer (90) is rotatable about the stirrer axis (94). The stirring shaft (92) is driven by a stirring motor (96).

As depicted in FIG. 1 and FIG. 2, the mixing device (88) is further comprised of a recirculation circuit (100) for recirculating at least a portion of the diluted tailings (40) from the tailings pool section (30) back to the interior (28) of the diluent recovery vessel (22) as recirculated tailings. As depicted in FIG. 1 and FIG. 2, the recirculation circuit (100) is in communication with both the tailings pool section (30) and with the interior (28) of the diluent recovery vessel (22) above the tailings pool section (30).

The diluted tailings (40) are passed through the recirculation circuit (100) in order to mix the diluted tailings (40). The recirculation circuit (100) is comprised of a conduit loop (102) and a pump (104) for passing the diluted tailings (40) through the recirculation circuit (100).

As depicted in FIG. 1 and FIG. 2, the conduit loop (102) is comprised of a tailings pool conduit (106) for recirculating the recirculated tailings back to the tailings pool section (30) and a vapour space conduit (108) for recirculating the recirculated tailings back to the interior (28) of the diluent recovery vessel (22) above the tailings pool section (30).

As depicted in FIG. 1 and FIG. 2, the recirculated tailings which are passed through the vapour space conduit (108) impinge upon a recirculation disperser which is located in the interior of the diluent recovery vessel (22). As depicted in FIG. 1 and FIG. 2, the recirculation disperser may be comprised of the stirring shaft (92) and/or a recirculation stirrer (109) which is mounted on the stirring shaft (92) and which rotates with the stirring shaft (92). The purpose of the recirculation disperser is to disperse the recirculated tailings within the vapour space which is located in the interior of the diluent recovery vessel (22) above the tailings pool section (30).

As depicted in FIG. 1 and FIG. 2, the recirculation circuit (100) is associated with the diluent recovered tailings component outlet (68) so that a portion of the diluent recovered tailings component (70) which is recovered from the diluent recovery vessel (22) via the diluent recovered tailings component outlet (68) is recirculated back to the tailings pool section (30) as the recirculated tailings. Valves (not shown) may be provided in the recirculation circuit (100) to control the amount of the diluent recovered tailings component (70) which is passed through the recirculation circuit (100) as recirculated tailings and the proportions of the recirculated tailings which are passed through the tailings pool conduit (106) and the vapour space conduit (108) respectively.

The apparatus (20) is further comprised of a foam breaking device (110) in the interior (28) of the diluent recovery vessel (22). FIG. 1 and FIG. 2 depict alternate embodiments of the foam breaking device (110).

Referring to FIG. 1, a first embodiment of the foam breaking device (110) is comprised of a foam breaker (112) which is located between the tailings pool section (30) of the diluent recovery vessel (22) and the upper end (26) of the diluent recovery vessel (22). The foam breaker (112) is rotatable about a foam breaker axis (114). As depicted in FIG. 1, the foam breaker axis (114) is substantially parallel with the vessel axis (32) and is also substantially coincident with the vessel axis (32). As depicted in FIG. 1, the foam breaker (112) is mounted on the stirring shaft (92) so that rotation of the stirring shaft (92) by the stirring motor (96) rotates both the stirrer (90) and the foam breaker (112). As depicted in FIG. 1, the foam breaker (112) is comprised of a brush.

The foam breaker (112) may assist in reducing the amount of foam which accumulates in the diluent recovery vessel (22). The foam breaker (112) may also assist in dispersing the diluted tailings (40) and/or breaking the diluted tailings (40) into smaller droplets as the diluted tailings (40) pass through the diluent recovery vessel (22) from the diluted tailings inlet (38) toward the tailings pool section (30). The foam breaker (112) may also provide an increased surface area for the diluted tailings (40) to contact as the diluted tailings (40) pass through the diluent recovery vessel (22), which may enhance the heat and mass transfer characteristics of the diluent recovery vessel (22).

Referring to FIG. 2, a second embodiment of the foam breaking device (110) is comprised of an increased horizontal dimension in the interior (28) of the diluent recovery vessel (22) and/or an increased cross-sectional area in the interior (28) of the diluent recovery vessel (22), relative to the tailings pool section (30) of the interior (28) of the diluent recovery vessel (22).

More particularly, the tailings pool section (30) is comprised of a tailings pool horizontal dimension (120), the foam breaking device (110) is comprised of a foam breaking horizontal dimension (122), and the foam breaking horizontal dimension (122) is hinter than the tailings pool horizontal dimension (120). Similarly, the tailings pool section (30) is comprised of a tailings pool cross-sectional area (124), the foam breaking device (110) is comprised of a foam breaking cross-sectional area (126), and the foam breaking cross-sectional area (124) is larger than the tailings pool cross-sectional area (126).

As depicted in FIG. 2, the ratio of the foam breaking horizontal dimension (122) to the tailings pool horizontal dimension (120) is about 1.75:1. As depicted in FIG. 2, the ratio of the foam breaking cross-sectional area (126) to the tailings pool cross-sectional area (124) is about 3:1.

As depicted in FIG. 2, the increased foam breaking horizontal dimension (122) and the increased foam breaking cross-sectional area (126) extends over an isolated section of the interior (28) of the diluent recovery vessel (22).

The method of the invention may be performed using the apparatus of the invention, or the method of the invention may be performed using an alternate apparatus or combination of apparatus.

The performance of the method of the invention using an apparatus similar to the apparatus (20) depicted in FIG. 1 and/or FIG. 2 is now described.

The method of the invention may be performed as a batch method or as a continuous method. In the description which follows, the method of the invention is described using the apparatus (20) depicted in FIG. 1 and/or FIG. 2 in a continuous method.

Diluted tailings (40) from a source of diluted tailings (40) are delivered to the diluted tailings heater (42) where they are heated to a desired feed temperature. The desired feed temperature may be the same as or different from the desired operating temperature for the method of the invention, depending upon whether a heater is provided in the diluent recovery vessel (22) and depending upon the desired operating temperature. In some embodiments, a desired operating temperature range for the method may generally be between about 40 degrees Celsius and about 120 degrees Celsius.

If the hydrocarbon diluent which is contained in the diluted tailings (40) consists of one or more naphthenic type diluents, the desired operating temperature for the method may generally be higher than if the hydrocarbon diluent consists of one or more paraffinic type diluents. In some embodiments, a desired operating temperature range for the method in conjunction with naphthenic type diluents may be between about 60 degrees Celsius and about 120 degrees Celsius. In some embodiments, a desired operating temperature range for the method in conjunction with paraffinic type diluents may be between about 40 degrees Celsius and about 70 degrees Celsius. In some embodiments, a desired operating temperature range for the method in conjunction with a mixture of naphthenic type diluents and paraffinic type diluents may be a compromise of the two above ranges.

The diluted tailings (40) pass from the diluted tailings heater (42) to the diluted tailings inlet (38) and then to the tailings distributor (44) where the diluted tailings (40) are distributed throughout the diluent recovery vessel (22). The diluted tailings (40) are introduced into the diluent recovery vessel (22) at a feed rate by weight of the diluted tailings (40).

The diluted tailings (40) move downward from the tailings distributor (44) through the interior (28) of the diluent recovery vessel (22) and form a railings pool (46) in the tailings pool section (30) of the diluent recovery vessel (22).

The interior (28) of the diluent recovery vessel (22) is maintained at the desired operating pressure for the method. In some embodiments, the desired operating pressure may be sub-atmospheric or slightly above atmospheric pressure. In some embodiments, a suitable operating pressure range for the method may generally be an absolute pressure between about 20 kPa (about 3 psia) and about 120 kPa (about 17 psia).

If the hydrocarbon diluent which is contained in the diluted tailings (40) consists of one or more naphthenic type diluents, the desired operating pressure for the method may generally be higher than if the hydrocarbon diluent consists of one or mote paraffinic type diluents. In some embodiments, a desired operating pressure range for the method in conjunction with naphthenic type diluents may be an absolute pressure between about 30 kPa (about 4 psia) and about 120 kPa (about 17 psia). In some embodiments, a desired operating pressure range for the method in conjunction with paraffinic type diluents may be an absolute pressure between about 20 kPa (about 3 psia) and about 110 kPa (about 16 psia). In some embodiments, a desired operating pressure range for the method in conjunction with a mixture of naphthenic type diluents and paraffinic type diluents may be a compromise of the two above ranges.

In some embodiments, the operating pressure for the method may be minimized in order to minimize the temperature at which the method is performed.

The diluted tailings (40) are subjected to two separate treatments in the tailings pool (46). First, an amount of steam (80) is introduced directly into the tailings pool (46) in order to transfer heat to the diluted tailings (40) and in order to subject the diluted tailings (40) to steam stripping or steam distillation. Second, the diluted tailings (40) in the tailings pool are mixed in order to promote an equilibrium state amongst the liquid and vapour phases of the components of the diluted tailings (40) and the steam (80).

These two treatments are continued for an appropriate residence time in order to provide an opportunity for the liquid and vapour phases of the components of the diluted tailings (40) and the steam (80) to achieve or approach the equilibrium state. In some embodiments, a suitable residence time of the diluted tailings (40) in the diluent recovery vessel (22) may be between about 1 minute and about 50 minutes.

If the diluted tailings (40) are comprised of, consist of, or consist essentially of a fine mineral material fraction of froth treatment tailings, the appropriate residence time may be longer than if the diluted tailings (40) consist of a coarse mineral material fraction. Similarly, if the hydrocarbon diluent content of the diluted tailings (40) is greater than about 3 percent by weight of the diluted tailings (40), the appropriate residence time may be longer than if the hydrocarbon diluent content of the diluted tailings (40) is less than about 3 percent by weight of the diluted tailings (40). The residence time may also be affected by other factors, including but not limited to the steam addition rate and the mixing intensity.

In some embodiments in which the diluted tailings (40) are comprised of consist of, or consist essentially of a coarse mineral material fraction and/or if the hydrocarbon diluent content of the diluted tailings (40) is less than about 3 percent by weight of the diluted tailings (40), a suitable residence time of the diluted tailings (40) in the diluent recovery vessel (22) may be between about 1 minute and about 20 minutes.

In some embodiments in which the diluted tailings (40) are comprised of, consist of or consist essentially of a fine mineral material fraction and/or if the hydrocarbon diluent content of the diluted tailings (40) is greater than about 3 percent by weight of the diluted tailings (40), a suitable residence time of the diluted tailings (40) in the diluent recovery vessel (22) may be between about 1 minute and about 50 minutes.

Referring to FIG. 1 and FIG. 2, introducing the steam (80) directly to the tailings pool (46) is comprised of distributing the steam (80) throughout the tailings pool (46) with the steam distributor (78). The steam (80) is provided to the steam distributor (78) by the source of the steam (80) and is introduced into the tailings pool (46) by the steam distributor (78) at a steam addition rate by weight of the steam (80). In some embodiments, the steam addition rate may be dependent upon the ked rate of the diluted tailings (40) into the diluent recovery vessel (22). In some embodiments, a suitable steam addition rate range may be between about 3 percent and about 100 percent of the feed rate. In some embodiments, a suitable steam addition rate range may be between about 5 percent and about 10 percent of the feed rate.

Referring to FIG. 1 and FIG. 2, mixing the diluted tailings (40) is comprised of stirring the diluted tailings (40) with the stirrer (90) at a stirring intensity. In some embodiments, a suitable stirring intensity range may be between about 0.05 watts per kilogram of the diluted tailings (40) and about 40 watts per kilogram of the diluted tailings (40). In some embodiments, a suitable stirring intensity range may be between about 1.5 watts per kilogram of the diluted tailings (40) and about 10 watts per kilogram of the diluted tailings (40).

Referring to FIG. 1 and FIG. 2, mixing the diluted tailings (40) is further comprised of passing the diluted tailings (40) through the recirculation circuit (100) at a recirculation rate. In some embodiments, the recirculation rate may be dependent upon the feed rate of the diluted tailings (40) into the diluent recovery vessel (22). In some embodiments, a suitable recirculation rate range may be between about 25 percent and about 100 percent of the feed rate. In some embodiments, a suitable recirculation rate range may be between about 25 percent and about 50 percent of the feed rate.

Mixing the diluted tailings (40) may assist in distributing the steam (80) throughout the tailings pool (46) by breaking the steam (80) into smaller droplets and/or dispersing the steam (80) throughout the diluted tailings (40).

The combination of introducing the steam (80) into the tailings pool (46) and mixing the diluted tailings (40) which are contained in the tailings pool (46) may result in the formation from the diluted tailings (40) of foam above the tailings pool (46). The presence of foam may be detrimental to the performance of the method.

Referring to FIG. 1 and FIG. 2, the method is further comprised of providing the foam breaking device (110) in the interior (28) of the diluent recovery vessel (22).

Referring to FIG. 1, one type of foam breaking device (110) is comprised of the foam breaker (112) which is rotatable with the stirrer (90) by the stirring shaft (92) and the stirring motor (96). The rotation of the foam breaker (112) breaks down the foam which is formed from the diluted tailings (40) and inhibits the foam from moving upward in the diluent recovery vessel (22).

Referring to FIG. 2, an alternate type of foam breaking device (110) is comprised of the increased foam breaking horizontal dimension and/or increased foam breaking cross-sectional area relative to the tailings pool horizontal dimension and/or the tailings pool cross-sectional area respectively. The presence of the increased foam breaker horizontal dimension and/or the increased foam breaker cross-sectional area inhibits the foam from moving upward in the diluent recovery vessel (22) and appears to inhibit the stability of the foam.

As a result of the combined effects of introducing the steam (80) directly into the tailings pool (46), mixing the diluted tailings (40) which are contained in the tailings pool (46), and providing a suitable residence time of the diluted tailings (40) in the diluent recovery vessel (22) to promote an equilibrium state amongst the liquid and vapour components of the diluted tailings (40) and the steam (80), the diluted tailings (40) are separated into the recovered diluent component (50) and the diluent recovered tailings component (70).

The recovered diluent component (50) moves upward through the diluent recovery vessel (22) to the recovered diluent component outlet (48) where the recovered diluent component (50) is recovered from the diluent recovery vessel (22) and passed to the condensing apparatus (52). In the condensing apparatus (52), the recovered diluent component (50) is condensed and separated into the recovered hydrocarbon diluent (60) and the recovered water (62). The recovered hydrocarbon diluent (60) may be recycled for use in a bitumen froth treatment process. The recovered water (62) may be recycled for use in a bitumen froth treatment process or some other process.

The diluent recovered tailings component (70) are retained in the tailings pool section (30) of the diluent recovery vessel (22) until the diluent recovered tailings component (70) is recovered from the diluent recovery vessel (22) via the diluent recovered tailings component outlet (68) by draining, pumping, augering or otherwise withdrawing the diluent recovered tailings component (70) from the diluent recovery vessel (22). After it is recovered from the diluent recovery vessel (22), the diluent recovered tailings component (70) may be further treated or may be disposed of.

EXAMPLES

Bench scale experimental testing of an embodiment of the method of the invention was conducted using several different types of diluted tailings. The bench scale experimental testing was conducted as a batch implementation of the method of the invention.

FIG. 3 is a table providing data from the bench scale experimental testing in which the diluted tailings consisted of either a heavy mineral. concentrate obtained from froth treatment tailings ("HMC"), a washed heavy mineral concentrate ("HMC-washed"), a fine mineral material fraction obtained from froth treatment tailings ("Fines"), or a dewatered fine mineral material fraction ("Fines-dewatered").

Figure 4:
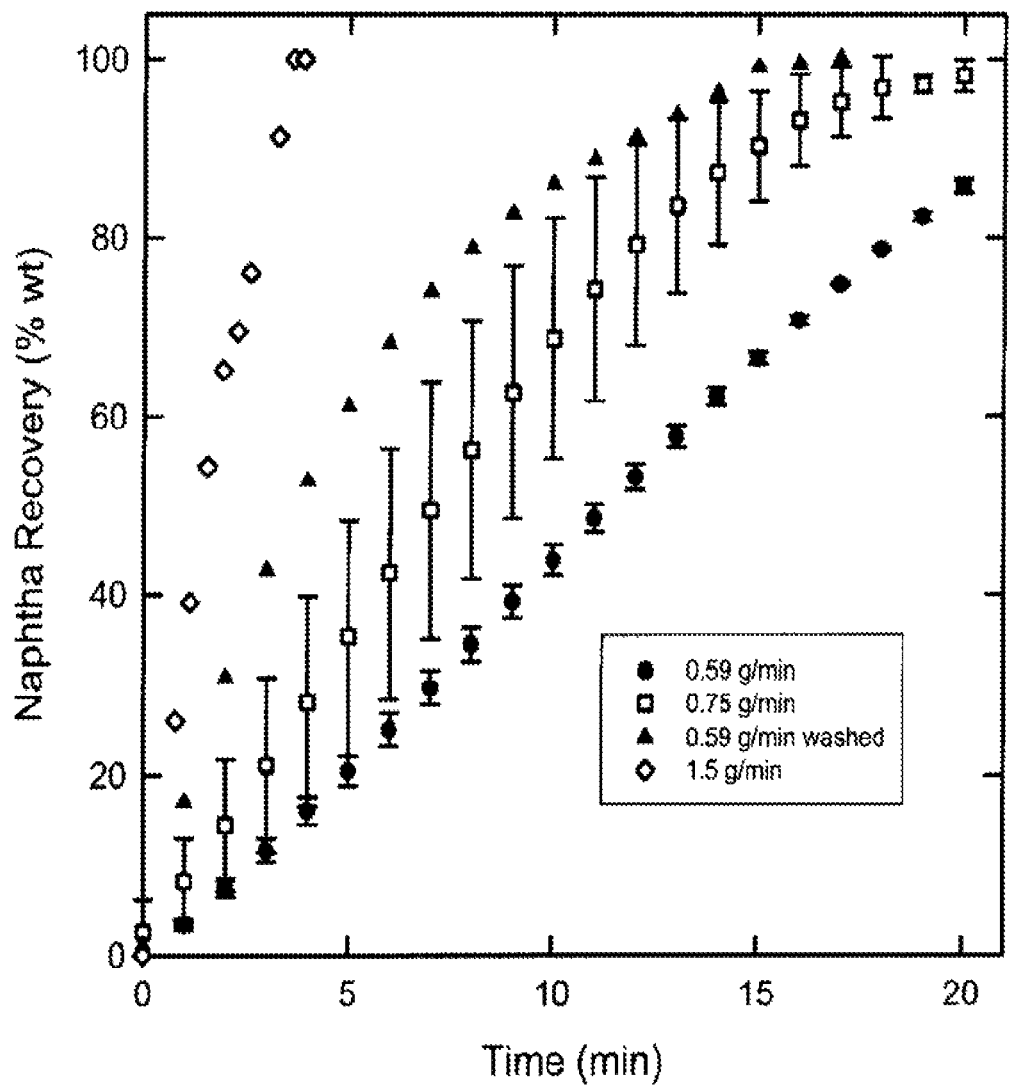
FIG. 4 is a graph presenting data resulting from bench scale experimental testing of an embodiment of the method of the invention, in which the diluted tailings consist of a heavy mineral concentrate obtained from froth treatment tailings.

FIG. 4 is a graph presenting data resulting from the bench scale experimental testing in which the diluted tailings consisted of a heavy mineral concentrate ("HMC") or a washed heavy mineral concentrate ("HMC-washed") obtained from froth treatment tailings. The data points presented in FIG. 4 represent the arithmetic average of data for as many as four test runs. The error bars represent the standard deviations of the data which provided the data points.

Figure 5:
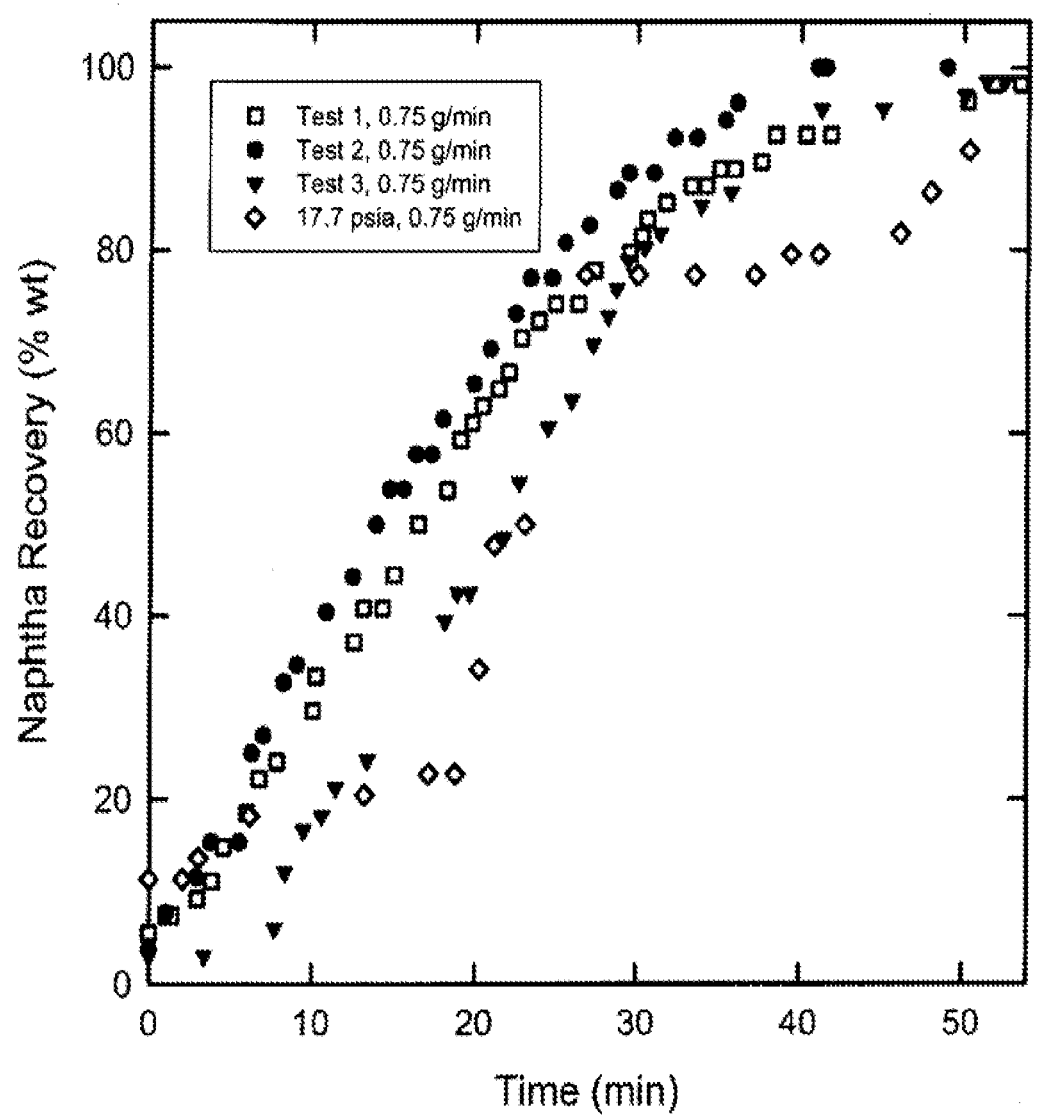
FIG. 5 is a graph presenting data resulting from bench scale experimental testing of an embodiment of the method of the invention, in which the diluted tailings consist of a fine mineral material fraction obtained from froth treatment tailings.

FIG. 5 is a graph presenting data resulting from the bench scale experimental testing in which the diluted tailings consisted of a fine mineral material fraction ("Fines") obtained from froth treatment tailings. The data points presented in FIG. 5 represent discrete data for a number of individual test runs.

The HMC was comprised of an aqueous slurry (containing about 50 wt % solid mineral material) of a coarse mineral material fraction of froth treatment tailings in which heavy minerals were concentrated. The Fines were comprised of an aqueous slurry (containing about 10 wt % solid mineral material) of a fine mineral material fraction of froth treatment tailings of the type which could be produced by separating froth treatment tailings by cycloning The washed heavy mineral concentrate ("HMC-washed") was a heavy mineral concentrate which was washed with water. Referring to FIG. 3, washing the heavy mineral concentrate effectively reduced the concentration of the hydrocarbon diluent in the heavy mineral concentrate via rejection of fine mineral material which is coated with hydrocarbon diluent.

The dewatered fine mineral material fraction "Fines-dewatered") was a fine mineral material fraction from which some water had been removed. Referring to FIG. 3, dewatering the fine mineral material fraction effectively increased the concentration of the hydrocarbon diluent in the fine mineral material fraction due to the removal of the water.

The hydrocarbon diluent for all of the bench scale experimental testing reported in FIGS. 3-5 consisted of naphtha. Referring to FIG. 3, the hydrocarbon diluent content for the HMC/HMC-washed samples ranged between about 0.76 wt % and about 1.47 wt % and the hydrocarbon diluent content for the Fines/Fines-dewatered samples ranged between about 9.31 wt % and 49.28 wt %. As a comparison, it is noted that a typical naphtha recovery unit (NRU) or tailings solvent recovery unit (TSRU) conventionally processes feed material which has a hydrocarbon diluent content which is in the order of about 5 wt %.

The apparatus (20) for the experimental testing was comprised of a stainless steel tube as the diluent recovery vessel (22). The tube had an outside diameter (OD) of about 5 cm (about 2 inches), a length of about 40 cm (about 16 inches), and was provided with closure fittings at each end to facilitate quick assembly and disassembly, addition or removal of the contents of the tube, and cleaning of the tube as necessary.

The apparatus (20) for the experimental testing was further comprised of a stirrer (90) for mixing the diluted tailings (40) and a recovered diluent component outlet (48) fur recovering the recovered diluent component (50) from the diluent recovery vessel (22).

The diluent recovery vessel (22) was heated to the desired operating temperatures using a test stand furnace and heating tape. The test stand furnace was used to keep the top of the diluent recovery vessel (22) and the recovered diluent component outlet (48) at a temperature slightly greater than 100 degrees Celsius to prevent condensation of the recovered diluent component (50) within the diluent recovery vessel (22) before reaching the condensing apparatus (52) and to minimize heat losses from the diluent recovery vessel (22) during steam stripping.

Three designs for the steam distributor (78) were evaluated during the experimental testing. A first design was comprised of a 0.3175 cm (0.125 inch) thick porous foam metal disk. A second design was comprised of a 0.159 cm (0.0625 inch) sintered metal disk. A third design was comprised of a dual-screen (25 micrometer opening) configuration. Results from the experimental testing suggested that the first design and the third design were less susceptible to plugging and a resulting undesirable increased pressure drop across the steam distributor (78) than was the second design.

Two options for mitigating foaming were evaluated during the experimental testing.

A first foam breaking option utilized a one inch diameter brush attached to the stirring shall (92) of the stirrer (90) at a location immediately below the recovered diluent component outlet (48). Tests performed in the diluent recovery vessel (22) out of the test stand under foaming conditions demonstrated that the brush could effectively break up the foam and prevent the foam from rising further in the diluent recovery vessel (22). The first option was similar to the foam breaking device (110) depicted in FIG. 1.

A second foam breaking option utilized a beaker having a diameter of about 12 cm (about 4.5 inches). The beaker was filled with an equivalent amount of diluted tailings (40) as was contained in the diluent recovery vessel (22) during the experimental testing. The beaker was placed on a hot plate and the temperature of the diluted tailings (40) was increased. It was observed that as the temperature of the diluted tailings (40) increased, an increasing amount of foam would be produced and would gradually rise in the beaker. The foam stopped rising at a level of about 40 percent of the beaker height. The size of the beaker was selected to simulate the foam breaking device (110) depicted in FIG. 2, having a larger diameter freeboard section as compared with the diluent recovery vessel (22) used in the experimental testing.

The experimental testing of the method of the invention was generally conducted according to the following procedure:

(a) the test stand furnace and heating tape and a steam generator furnace were switched on and set to the desired temperatures;

(b) once the steam generator furnace reached its desired temperature, a water pump was switched on to initiate steam generation, with the flow of steam (80) being directed to a bypass line in order to bypass the diluent recovery vessel (22);

(c) the diluent recovery vessel (22) was preloaded with a desired batch amount of diluted tailings (40) and installed in the test unit;

(d) one the test stand furnace reached the desired 100 degree Celsius temperature, the flow of steam (80) was redirected from the bypass line to the diluent recovery vessel (22) and stirring of the diluted tailings (40) was commenced;

(e) the volumes of the recovered hydrocarbon diluent (60) and the recovered water (62) which were separated from the recovered diluent component (50) in the condensing apparatus (52) were measured as a function of time;

(f) the flow of steam (80) and the mixing of the diluted tailings (40) continued until the rate of condensation of the recovered hydrocarbon diluent (60) in the condensing apparatus (52) decreased to nearly zero or until a desired duration of the flow of steam (80) and mixing of the diluted tailings (40) following an initial condensation of the recovered hydrocarbon diluent (60) was attained, at which time the flow of steam (80) and the mixing of the diluted tailings (40) ceased and the steam (80) was again diverted to the bypass line;

(g) after completion of the test, all of the inlets and outlets in the diluent recovery vessel (22) were capped off and the diluent recovery vessel (22) was removed from the test stand;

(h) after the diluent recovery vessel (22) cooled to the ambient temperature, it was opened and the recovered diluent tailings component (70) contained in the diluent recovery vessel (22) was removed and prepared for analysis by centrifuging and decanting; and (i) the separated solid and liquid components of the recovered diluent tailings component (70) were weighed and analyzed for water content, hydrocarbon diluent content, and bitumen content.

As indicated above, FIGS. 3-5 present data resulting from the bench scale experimental testing.

Referring to FIGS. 3-5, it is noted that the operating parameters for the testing were generally as follows:
Operating Temperature: about 99-105 degrees Celsius
Operating Pressure: about 1-1.2 atmosphere absolute
Steam Addition Rate: about 0.59-1.5 g/min
Steam-To-Feed Ratio: about 0.03-0.40

The following is noted from observations made during the experimental testing and from a review of FIGS. 3-5:

(a) the recovery of the hydrocarbon diluent from the HMC and HMC-washed diluted tailings (40) in the experimental testing resulted in a hydrocarbon diluent content in the diluent recovered tailings component (70) of between about 0.072 wt % and about 0.152 wt %, representing a hydrocarbon diluent recovery of between about 89.1 percent and about 91.7 percent;

(b) the recovery of the hydrocarbon diluent from the Fines and Fines-dewatered diluted tailings (40) in the experimental testing resulted in a hydrocarbon diluent cement in the diluent recovered tailings component (70) of between about 0.050 wt % and about 0.146 wt %, representing a hydrocarbon diluent recovery of between about 98.4 percent and about 99.8 percent;

(c) the data pertaining to the processing of the Fines-dewatered diluted tailings (40) suggests that increasing the solids content and the hydrocarbon diluent content of the diluted tailings (40) to as high as 49.28 percent had no detrimental effect on either the extent of recovery of the hydrocarbon diluent from the diluted tailings (40) or upon the hydrocarbon diluent content of the diluent recovered tailings component (70);

(d) at moderate steam addition rates (0.59 g/min and 0.75 a residence time of about 15 to 20 minutes was necessary to obtain near complete recovery (i.e., greater than about 80 percent) of the hydrocarbon diluent from the HMC and HMC-washed diluted tailings (40), while a residence time of about 40-50 minutes was necessary to obtain near complete recovery (i.e., greater than about 80 percent) of the hydrocarbon diluent from the Fines and Fines-dewatered diluted tailings (40);

(e) at a relatively high steam addition rate (1.5 g/min), a residence time of less than 5 minutes was necessary to obtain a near complete recovery greater than about 80 percent) of the hydrocarbon diluent from HMC diluted tailings (40);

(f) the hydrocarbon diluent contents of the Fines and Fines-dewatered diluted tailings (40) were significantly higher (by nearly an order of magnitude) than the hydrocarbon diluent contents of the HMC and HMC-washed diluted tailings (40);

(g) having regard to Points (d), (e) and (f) above, the residence time necessary to obtain near complete recovery (i.e., greater than about 80 percent) of the hydrocarbon diluent from diluted tailings (40) using the method of the invention may he dependent upon the time required to achieve or approach an equilibrium state amongst the liquid and vapour phases of the components of the diluted tailings (40) and the steam (80);

(h) having regard to Points (d), (e) and (f) above, the residence time necessary to obtain near complete recovery (i.e., greater than about 80 percent) of the hydrocarbon diluent from diluted tailings (40) using the method of the invention may be dependent upon the composition of the diluted tailings (40), upon the hydrocarbon diluent content of the diluted tailings (40), upon the steam addition rate, upon the mixing intensity, or upon a combination of these and/or other factors; and (i) having regard to Point (e) above, the residence time necessary to obtain near complete recovery (i.e., greater than about 80 percent) of the hydrocarbon diluent from diluted tailings (40) using the method of the invention may be dependent upon the time required to achieve or approach an equilibrium state amongst the liquid and vapour phases of the components of the diluted tailings (40) and the steam (80), which in turn may be dependent upon the composition of the diluted tailings (40), upon the hydrocarbon diluent content of the diluted tailings (40), upon the steam addition rate, upon the mixing intensity, or upon a combination of these and/or other factors.

Observations From Pilot Plant Testing

Extensive pilot plant experimental testing of the invention was conducted on several different types of diluted tailings containing several different types of hydrocarbon diluent.

In the pilot plant testing, the invention was used to recover naphtha diluent from both a fine mineral material fraction obtained from froth treatment tailings ("Fines") and a heavy mineral concentrate obtained from froth treatment tailings ("HMC"). In general, the invention was used in concert with upstream modules producing the Fines and HMC, with minor outages related to existing pumping infrastructure. In the pilot plant testing, the apparatus of the invention consisted of two vertical column diluent recovery vessels, one to process Fines and one to process HMC, each with associated overhead condensing apparatus.

Nearly all of the data from the pilot plant testing was generated under the following operating parameters:
Steam-To-Feed Ratio: about 5-10 percent for Fines
  about 100 percent for HMC
Recycle-To-Feed Ratio: about 25 percent to greater than 100 percent
Residence Time: about 5-10 minutes
Feed Rate: about 3 kilograms per minute for Fines
  about 0.5 kilograms per minute for HMC The data generated from the pilot plant testing was evaluated with respect to a number of criteria relating to diluent recovery performance.

1. Residual Diluent In Fines

Figure 6:
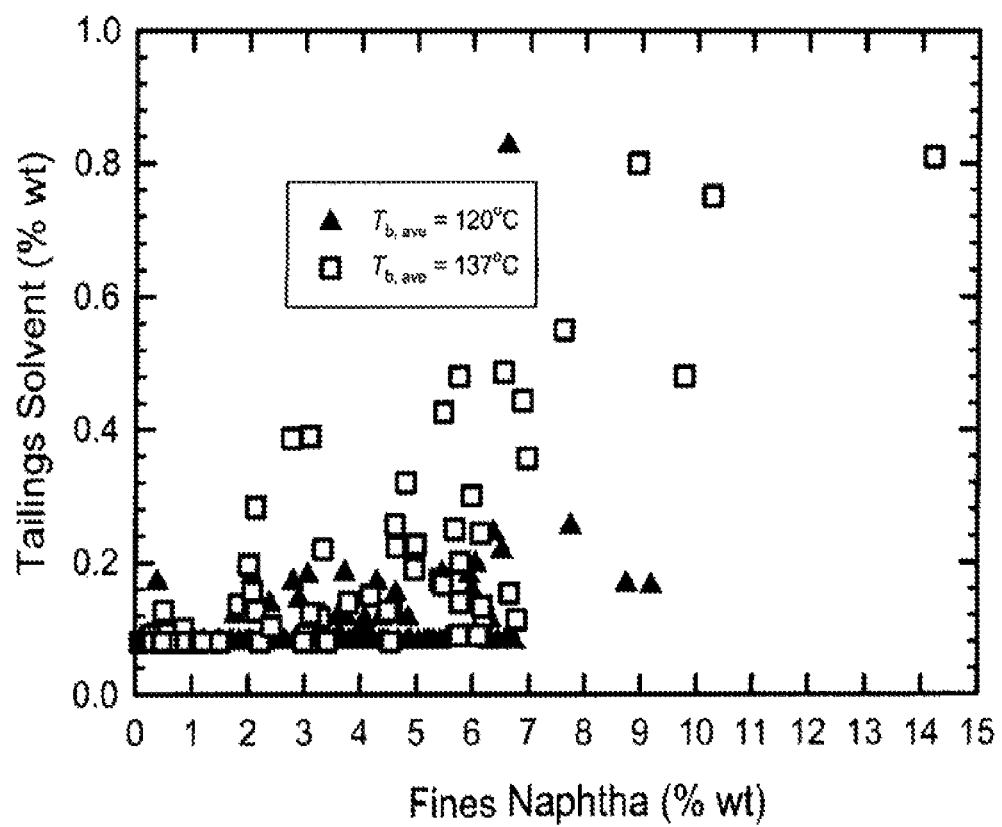
FIG. 6 is a graph presenting data resulting from pilot plant testing of an embodiment of the method of the invention, in which the diluted tailings consist of a fine mineral material fraction obtained from froth treatment tailings.

FIG. 6 is a graph presenting data resulting from pilot plant testing of an embodiment of the invention in which the diluted tailings consist of Fines.

In the pilot plant testing of Fines which is reported in FIG. 6. two different types of naphtha as the hydrocarbon diluent were tested. One naphtha was a light naphtha having an average boiling temperature of about 120 degrees Celsius. This light naphtha was a hydrotreated naphtha produced from bitumen extracted from the Athabasca region. The other naphtha was Jet B jet fuel having an average boiling temperature of about 137 degrees Celsius.

The naphtha concentration in the Fines ranged from much less than about 1 percent to about 14 percent by Weight Referring to FIG. 6, it appears that better diluent recovery performance was achieved with the light naphtha diluent than with the Jet B jet fuel, and that above a critical naphtha concentration in the Fines of about 5 percent the diluent recovery performance of the invention appeared to degrade.

2. Residual Diluent In HMC

Figure 7:
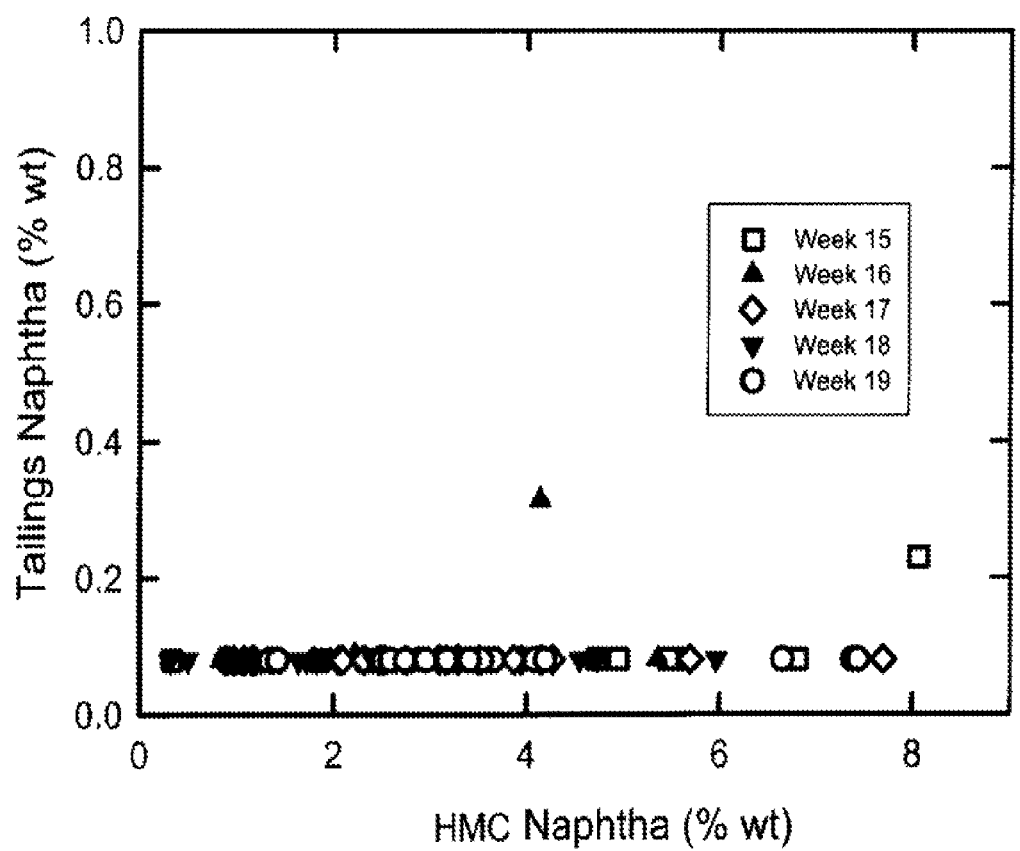
FIG. 7 is a graph presenting data resulting from pilot plant testing of an embodiment of the method of the invention, in which the diluted tailings consist of a heavy mineral concentrate obtained from froth treatment tailings.

FIG. 7 is a graph presenting data resulting from pilot plant testing of an embodiment of the invention in which the diluted tailings consist it of HMC.

One type of naphtha (let B jet fuel) was used in the pilot plant testing of HMC which is reported in FIG. 7. The naphtha concentration in the HMC ranged from about 0.1 percent to about 10 percent by weight. As indicated in FIG. 7, at naphtha concentrations of up to about 8 percent, the invention consistently removed almost all of the hydrocarbon diluent from the HMC (essentially down to the analytical detection limit).

3. Diluent Recovery From Fines

Figure 8:
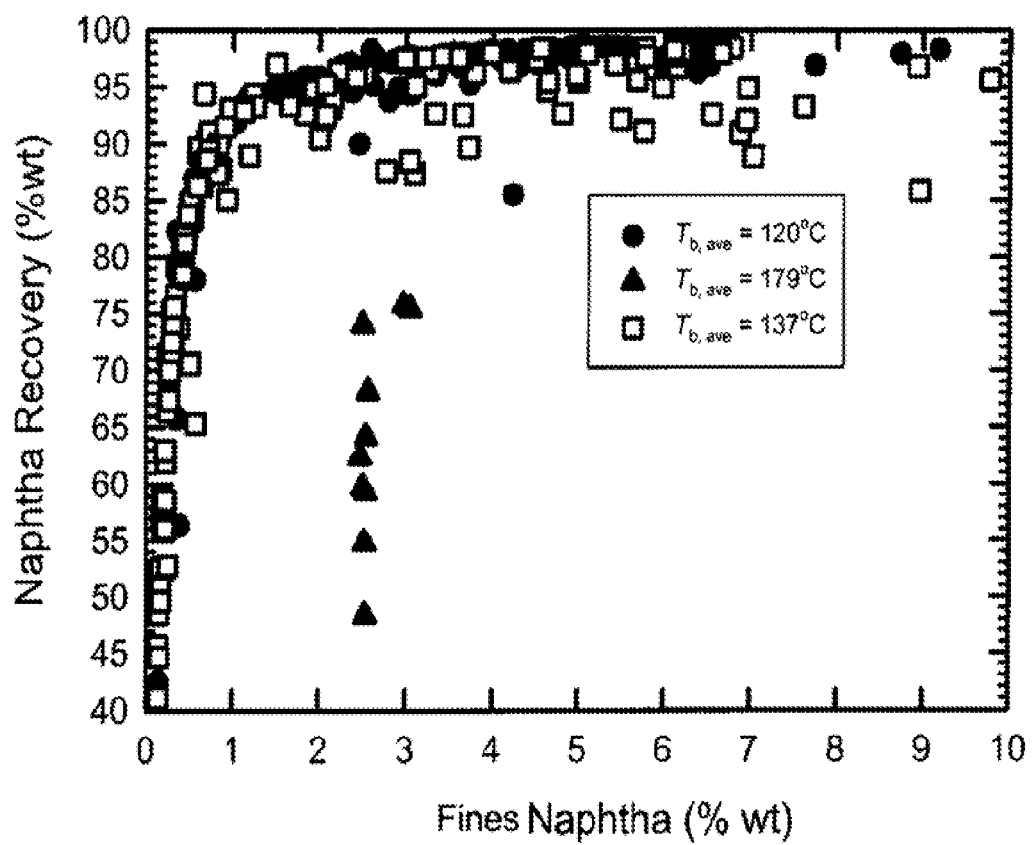
FIG. 8 is a graph presenting data resulting from pilot plant testing of an embodiment of the method of the invention, in which the overall diluent recovery is shown for a fine mineral material fraction obtained from froth treatment tailings.

Overall diluent recovery from Fines in the pilot plant testing is presented in FIG. 8.

In the pilot plant testing of Fines which is reported in FIG. 8, three different types of naphtha as the hydrocarbon diluent were tested. One naphtha was a light naphtha having an average boiling temperature of about 120 degrees Celsius. A second naphtha was Jet B jet fuel having an average boiling temperature of about 137 degrees Celsius. A third naphtha was a heavy naphtha having an average boiling temperature of about 179 degrees Celsius.

A wide range of key operating parameters was systematically tested in the pilot plant testing of Fines which is reported in FIG. 8, including the steam addition rate, mixing intensity and residence time. The invention achieved an average naphtha recovery from the Fines in excess of about 90 percent and often at about 95 percent. This performance was achieved under severe operating conditions which exceeded the original design specifications for the method and the apparatus of the invention which were used in the pilot plant testing.

Referring to FIG. 8, diluent recovery less than about 90 percent was often coincident with an unusually low or unusually high naphtha content in the Fines. In almost all cases, the diluent recovered tailings had a naphtha concentration that was below the detection limit (0.08 percent by weight) of the analytical method being used. As indicated in FIG. 8, for Fines having a naphtha concentration greater than about 1 percent, the average recovery of Jet B jet fuel using the invention was 93.7 percent±3.9 percent and the average recovery of the light naphtha was 96.7 percent±2.6 percent.

4. Diluent Recovery From HMC

Figure 9:
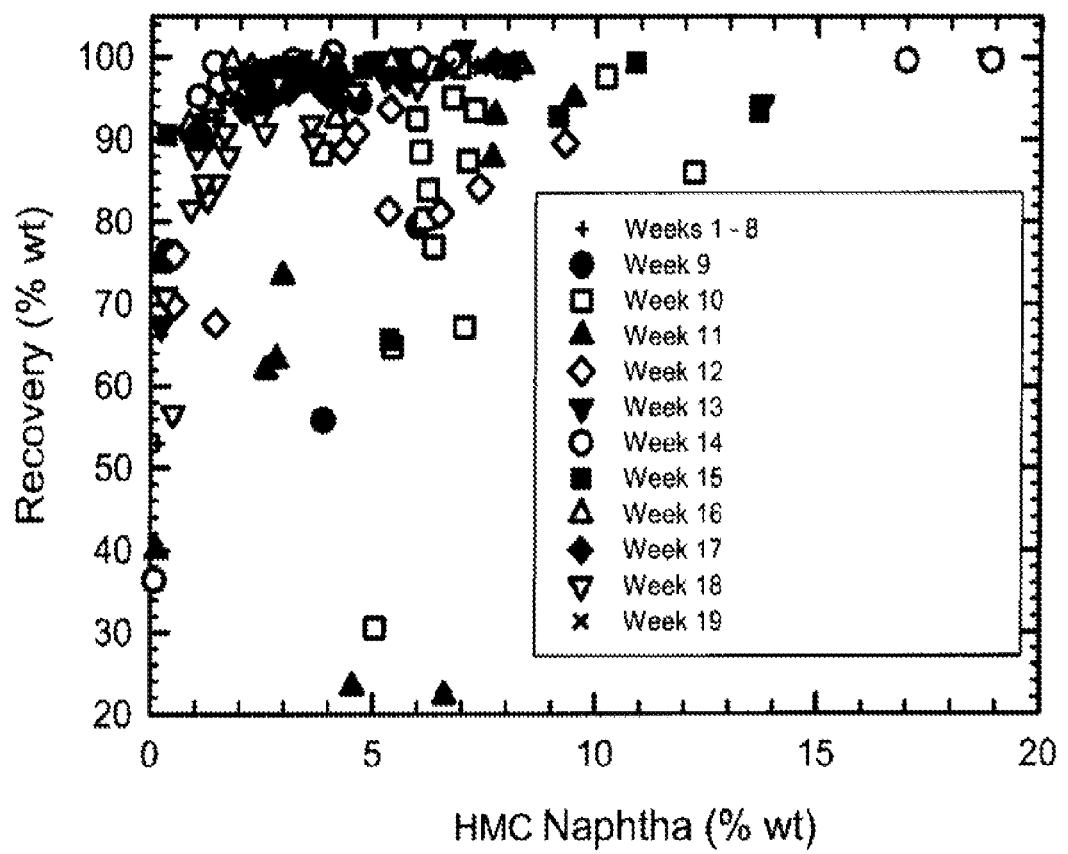
FIG. 9 is a graph presenting data resulting from pilot plant testing of an embodiment of the method of the invention, in which the overall diluent recovery is shown for a heavy mineral concentrate obtained from froth treatment tailings.

Overall diluent recovery from HMC in the pilot plant testing is presented in FIG. 9.

As indicated in FIG. 9, the invention was capable of high diluent recovery of naphtha from the HMC, often achieving values of over 95 percent. Lower recoveries were experienced when the HMC contained relatively low amounts of naphtha.

The naphtha content in nearly all diluent recovered tailings produced by the invention from the HMC was below the detection limit (0.08 percent by weight) of the analytical method being used. Lower diluent recoveries were, however, observed in some of the data. It is believed that these lower diluent recoveries may have been due to inconsistencies in the solids contained in the HMC. The performance of the invention during testing of HMC was generally reliable during the entire phase of testing. The average diluent recovery from the HMC was 93.9 percent±15.2 percent when Jet B jet fuel was utilized as the hydrocarbon diluent.

5. Quality Of Recovered Diluent

Figure 10:
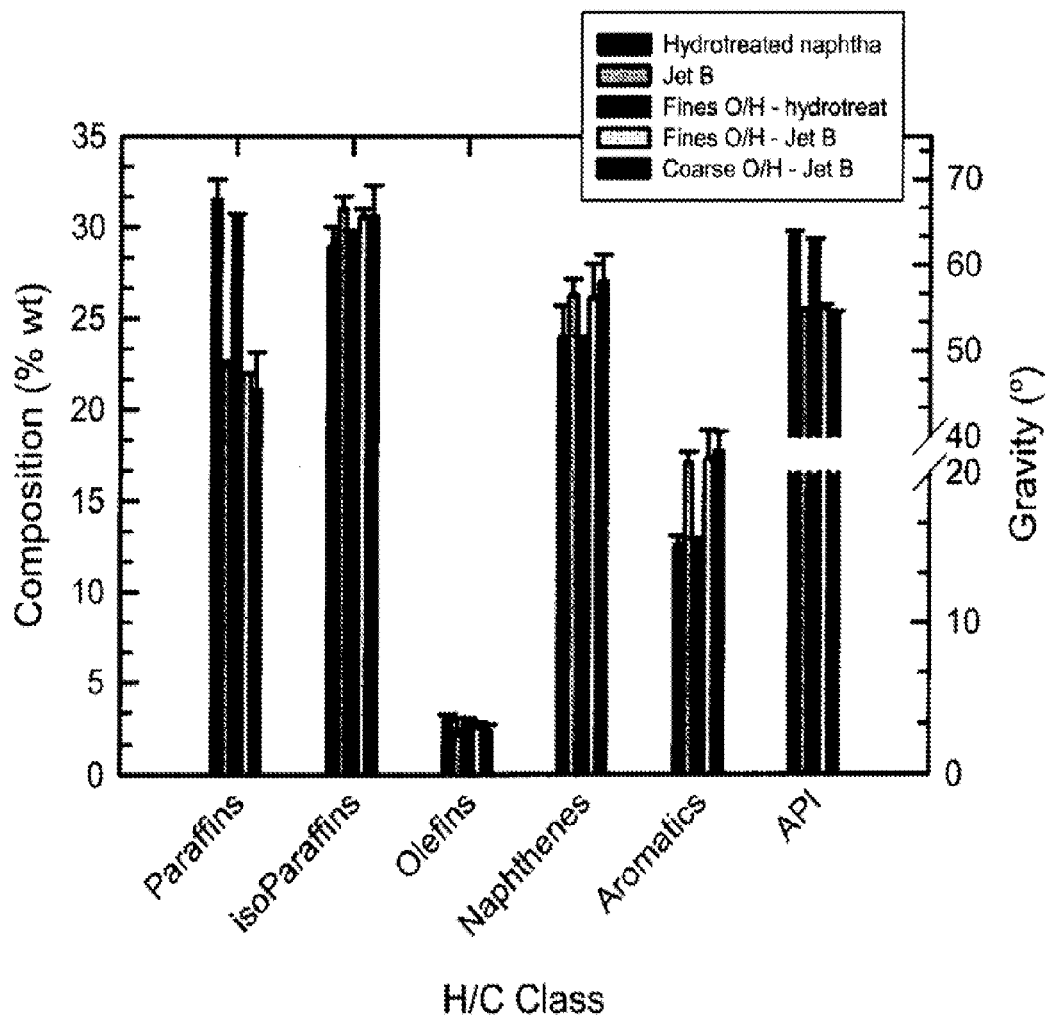
FIG. 10 is a graph presenting data resulting from pilot plant testing of an embodiment of the method of the invention, providing compositional breakdown and API gravity for the Jet B jet fuel and the light naphtha as process feed diluents, and for Jet B jet fuel and light naphtha recovered from a fine mineral material fraction and a heavy mineral concentrate obtained from froth treatment tailings.

FIG. 10 is a graph providing compositional breakdown and API gravity for the Jet B jet fuel and the light naphtha as process feed diluents, and for Jet B jet fuel and light naphtha recovered from Fines and HMC during the pilot plant testing.

The naphtha recovered and condensed from the pilot plant testing of Fines and HMC was compared to the process feed naphtha. During the majority of the pilot plant testing reported in FIG. 10, Jet-B jet fuel was utilized for both the Fines and HMC.

Jet B jet fuel is an aviation fuel with a density of about 758.9±0.56 kg/m$^3$ and a corresponding API gravity of about 54.8±0.12 degrees. The aromaticity of the Jet B jet fuel utilized in the pilot plant testing was measured by PIONA analysis to be about 17.1±0.57 percent (by weight). The compositional breakdown, as determined by PIONA analysis, is presented in FIG. 10. It is noted that the Jet B jet fuel was comprised of approximately 22 percent paraffins and about 30 percent isoparaffins. The olefin content was low, at approximately 3 percent, and the naphthenes were measured at about 26 percent. This compositional breakdown is similar to that of the light naphtha produced from bitumen extracted from the Athabasca region.

Figure 11A:
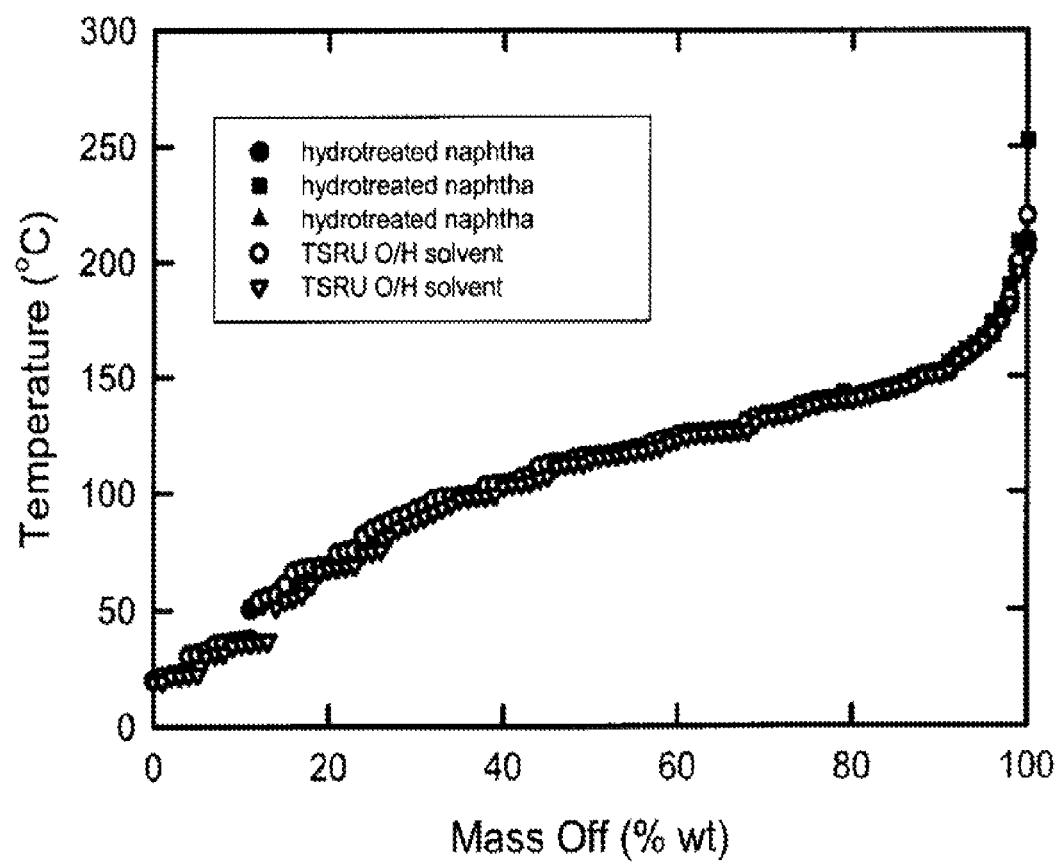
FIGS. 11a and 11b are graphs presenting data resulting from simulated distillations of the Jet B jet fuel and the diluents recovered during pilot plant testing of an embodiment of the method of the invention.
Figure 11B:
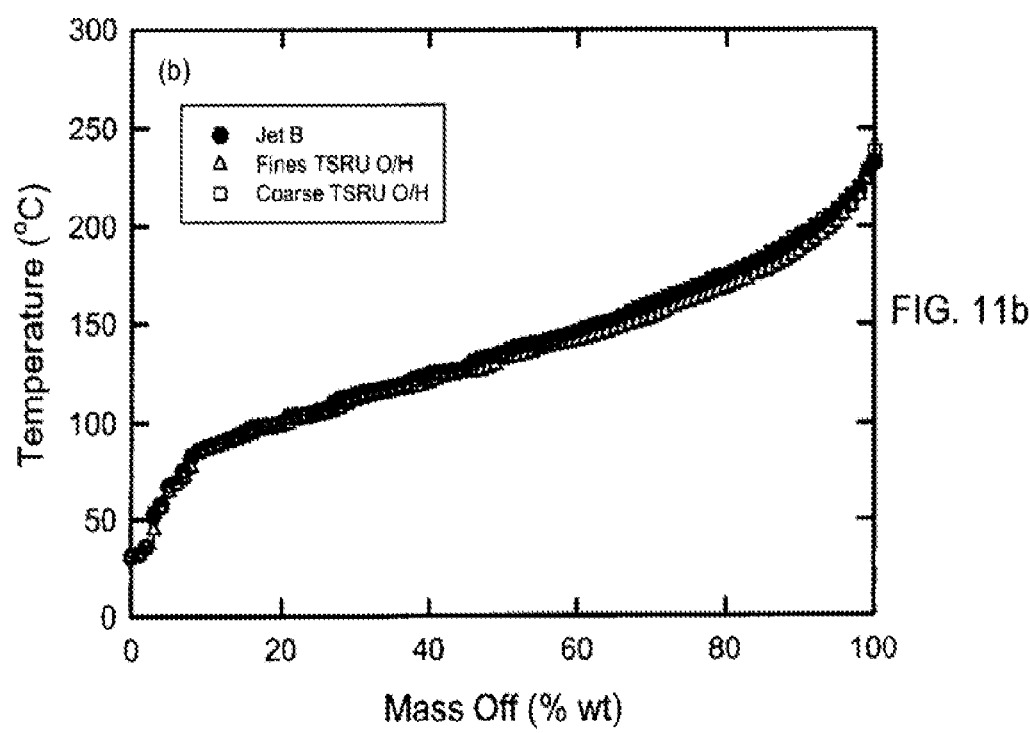

Referring to FIG. 11, simulated distillations of the jet B jet fuel and the diluents recovered during the pilot plant testing indicate near identical thermal behaviors. The simulated distillation analyses strongly indicate that the invention has the ability for both Fines and HMC to pull the heavier ends of the Jet B jet fuel diluent Out of the Fines and the HMC under atmospheric pressure and at operating temperatures under about 100 degrees Celsius. This is evidenced in the near identical mapping of the recovered diluents relative to both the Jet B and the light naphtha utilized in the pilot plant testing of the invention in connection with both Fines and HMC.

6. Environmental Impact and Significance of the Invention

The residual naphtha content in the diluent recovered tailings is an important consideration with respect to assessing potential opportunities for integrating the invention into oil sands recovery processes. From a regulatory perspective, oil sands producers are limited in the amount of diluent that can be discharged into tailings ponds. For example, an Alberta Energy and Utilities Board decision (AEUB, 2004) requires that no more than 4 barrels of naphtha be released for each 1000 barrels of dry bitumen produced. This type of regulation is in place for all oil sands producers and the release limit is expected to become more stringent in the future.

A second potential integration opportunity can be identified through the commodity value of naphtha. As discussed above, the naphtha recovered from the Fines and HMC during pilot plant testing of the invention is near-identical to that of the feed diluents. As such, it may claim a similar market price and its recovery and/or prevention from wasting can potentially be directly translated into an economic benefit.

The release of diluent which may potentially result from processing tailings such as Fines and HMC using the invention can be estimated through knowledge of typical production and tailings volumetric data. Given that a typical bitumen froth is comprised of about 55-60 percent bitumen with the balance consisting essentially of water and solid mineral material, one could postulate that for every 1.5 barrels of bitumen produced about 1 barrel of tailings will be generated. However, in complex extraction operations, additional waste water streams are often directed through the produced tailings pipeline, in part to assist with operations (e-line maintenance in centrifuges, make up water in steam strippers etc). As a result, the actual amount of tailings generated by oil sands processing may likely approach or exceed 1 barrel of tailings for each 1 barrel of bitumen produced.

Figure 12:
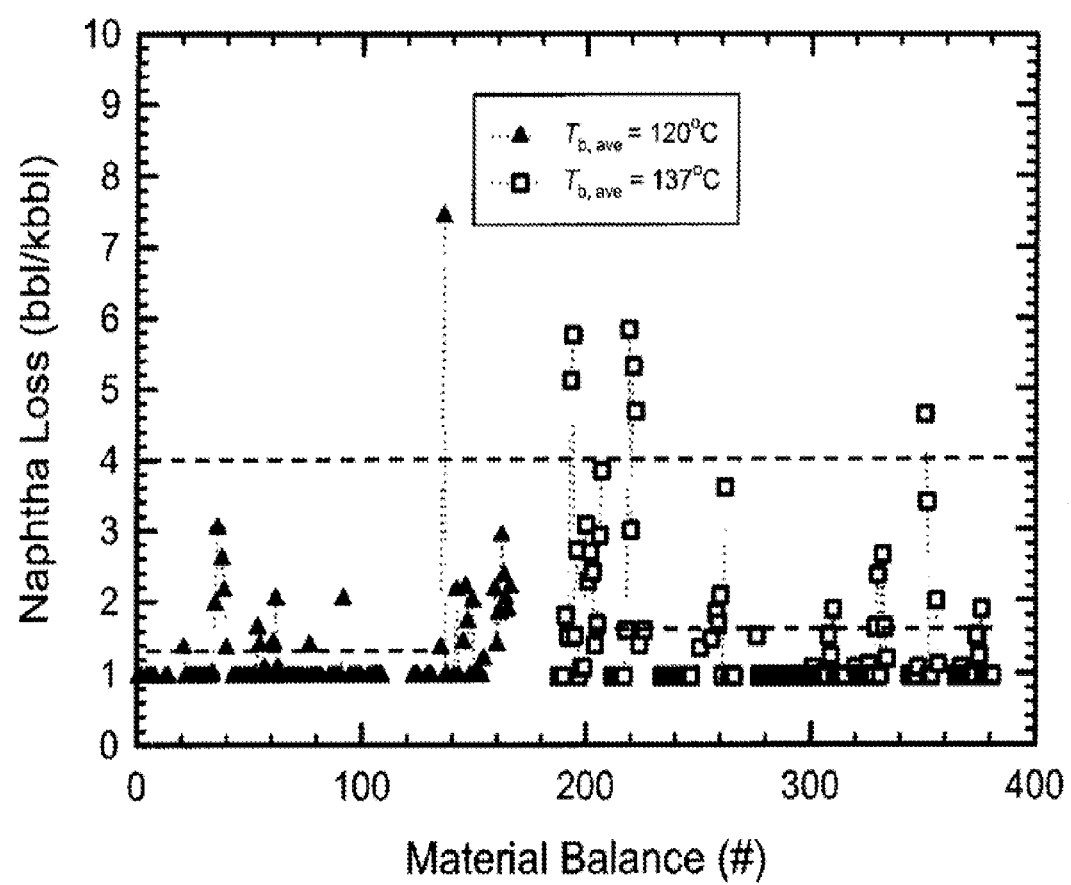
FIG. 12 is a graph presenting an estimate of an anticipated naphtha release rate resulting from pilot plant testing of an embodiment of the method of the invention, in which the diluted tailings consist of a fine mineral material fraction obtained from froth treatment tailings.

The anticipated naphtha release rate which may result from use of the invention is estimated in FIG. 12 for the processing of Fines using the invention. In FIG. 12, the relative amount of naphtha in diluent recovered tailings produced in the pilot plant testing has been scaled to typical bitumen production rates of a large commercial operation.

In FIG. 12, the EUB mandated release limit of 4 barrels of naphtha per 1000 barrels of dry bitumen production is indicated by a broken line. The estimated potential naphtha release per 1000 barrels of dry bitumen produced is provided for both light naphtha and jet B jet fuel as the hydrocarbon diluent.

Using light naphtha, the estimated average naphtha loss is about 1.25 barrels of naphtha per 1000 barrels of dry bitumen produced. Using Jet B jet fuel, the estimated average naphtha loss is about 1.77 barrels of naphtha per 1000 barrels of dry bitumen produced. It is believed that these values are likely conservative.

Referring to FIG. 12, there are a few serious excursions above 2 barrels of naphtha per 1000 bands of dry bitumen produced and there is a 'flat-line' behavior of a significant number of the data. The larger excursions can possibly be correlated to process control anomalies. Further, the line-out performance at about 1 barrel of naphtha per 1000 barrels of dry bitumen produced may be an artifact of the sensitivity of the analytical technique used to measure residual diluent content in the diluent recovered tailings. Both of these rates represent a significant reduction in naphtha release rate compared to the mandated EUB naphtha release limit of 4 barrels of naphtha per 1000 barrels of dry bitumen produced.

7. Effect of Varying Operating Parameters

Figure 13:
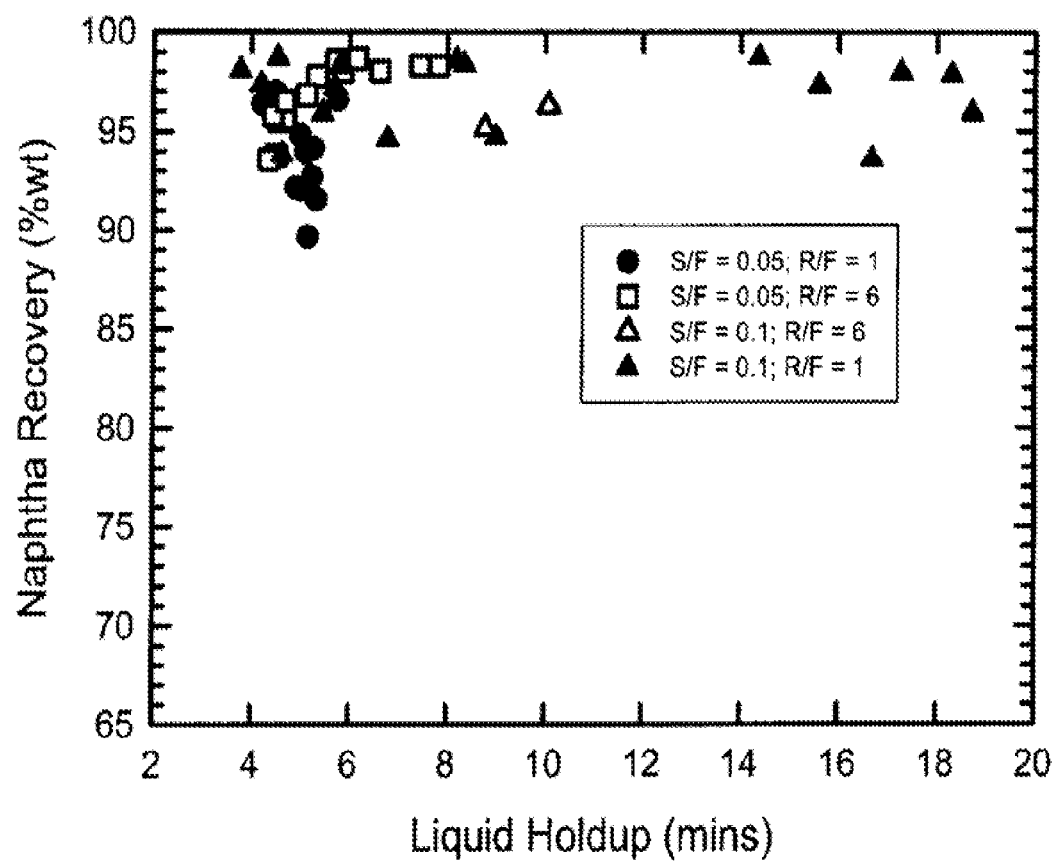
FIG. 13 is a graph presenting data from pilot plant testing of an embodiment of the method of the invention to recover diluent from a fine mineral material fraction obtained from froth treatment tailings, in which naphtha recovery is reported as a function of residence time at varying steam-to-feed ratios and the recycle-to-feed ratios.

FIG. 13 is a graph presenting data from the pilot plant testing of the invention to recover diluent from Fines in which naphtha recovery is reported as a function of residence time at varying steam-to-feed ratios and recycle-to-feed ratios. For the data reported in FIG. 13, the hydrocarbon diluent is light naphtha and the tailings pool was stirred at about 350 revolutions per minute.

Figure 14:
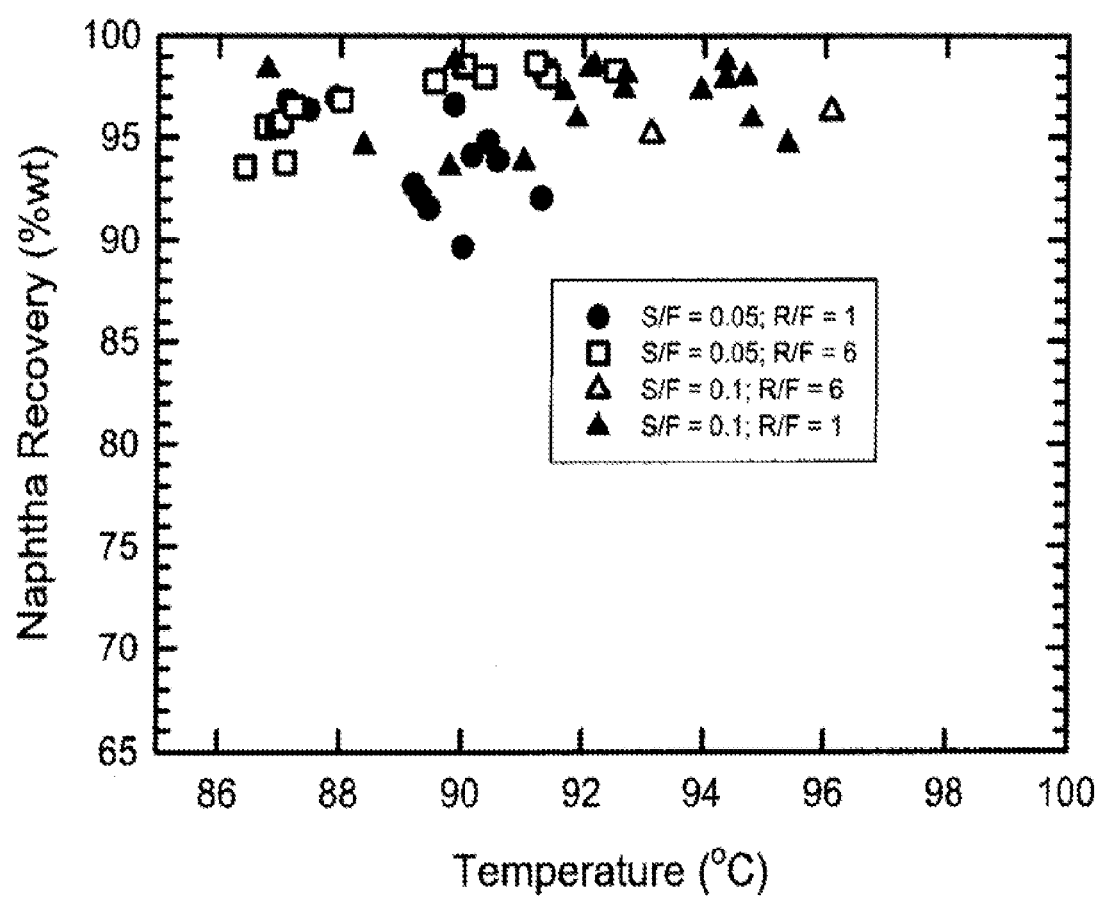
FIG. 14 is a graph presenting data from pilot plant testing of an embodiment of the method of the invention to recover diluent from a fine mineral material fraction obtained from froth treatment tailings, in which naphtha recovery is reported as a function of temperature at varying steam-to-feed ratios and recycle-to-feed ratios.

FIG. 14 is a graph presenting data from the pilot plant testing of the invention to recover diluent from Fines in which naphtha recovery is reported as a function of temperature at varying steam-to-feed ratios and recycle-to-feed ratios. For the data reported in FIG. 14, the hydrocarbon diluent is light naphtha and the tailings pool was stirred at about 350 revolutions per minute.

In this document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The embodiments of the invention in which an exclusive property or privilege is claimed are defined as follows:

1. A method of separating a diluted tailings comprising a hydrocarbon diluent into a recovered diluent component and a diluent recovered tailings component, wherein the diluted tailings are derived from a bitumen froth treatment process, the method comprising:
   (a) introducing the diluted tailings into an interior of a diluent recovery vessel so that the diluted tailings form a tailings pool in a tailings pool section of the diluent recovery vessel;
   (b) introducing an amount of steam directly into the tailings pool;
   (c) mixing the components of the diluted tailings and the steam which are contained in the tailings pool, wherein mixing is comprised of stirring the diluted tailings in the tailings pool;
   (d) maintaining the diluted tailings in the diluent recovery vessel for a residence time in order to separate the diluted tailings into the recovered diluent component and the diluent recovered tailings component;
   (e) recovering the recovered diluent component from the diluent recovery vessel; and
   (f) recovering the diluent recovered tailings component from the diluent recovery vessel.

2. The method as claimed in claim 1 wherein the interior of the diluent recovery vessel has an absolute pressure of between 20 kPa and 120 kPa.

3. The method as claimed in claim 1 wherein the interior of the diluent recovery vessel has a temperature of between 40 degrees Celsius and 120 degrees Celsius.

4. The method as claimed in claim 1 wherein introducing the steam directly into the tailings pool is comprised of distributing the steam throughout the tailings pool with a steam distributor located in the tailings pool.

5. The method as claimed in claim 4 wherein the steam distributor is configured so that the steam is introduced directly into the tailings pool in a direction toward a lower end of the diluent recovery vessel.

6. The method as claimed in claim 1 wherein the residence time is between 1 minute and 50 minutes.

7. The method as claimed in claim 1 wherein stirring the diluted tailings is performed at a stirring intensity of between 0.05 watts per kilogram and 40 watts per kilogram.

8. The method as claimed in claim 7 wherein stirring the diluted tailings is performed at a stirring intensity of between 1.5 watts per kilogram and 10 watts per kilogram.

9. The method as claimed in claim 1 wherein the diluted tailings are introduced into the diluent recovery vessel at a feed rate by weight, wherein the steam is introduced into the tailings pool at a steam addition rate by weight, and wherein the steam addition rate is between 3 percent and 100 percent of the feed rate.

10. The method as claimed in claim 9 wherein the steam addition rate is between 5 percent and 10 percent of the feed rate.

11. The method as claimed in claim 1 wherein the diluent recovery vessel has a lower end and an upper end and wherein the tailings pool is formed at the lower end of the diluent recovery vessel, further comprising providing a foam breaking device in the interior of the diluent recovery vessel between the tailings pool and the upper end of the diluent recovery vessel.

12. The method as claimed in claim 1 wherein the hydrocarbon diluent is comprised of a naphthenic type diluent.

13. The method as claimed in claim 12 wherein an interior of the diluent recovery vessel has an absolute pressure of between 30 kPa and 120 kPa.

14. The method as claimed in claim 12 wherein an interior of the diluent recovery vessel has a temperature of between 60 degrees Celsius and 120 degrees Celsius.

15. The method as claimed in claim 1 wherein the hydrocarbon diluent is comprised of a paraffinic type diluent.

16. The method as claimed in claim 15 wherein an interior of the diluent recover vessel has an absolute pressure of between 20 kPa and 110 kPa.

17. The method as claimed in claim 15 wherein an interior of the diluent recovery vessel has a temperature of between 40 degrees Celsius and 70 degrees Celsius.

18. The method as claimed in claim 1 wherein the diluted tailings are comprised of a coarse mineral material fraction of a froth treatment tailings.

19. The method as claimed in claim 18 wherein the hydrocarbon diluent is comprised of a naphthenic type diluent.

20. The method as claimed in claim 18 wherein the hydrocarbon diluent is comprised of a paraffinic type diluent.

21. The method as claimed in claim 18 wherein the residence time is between 1 minute and 20 minutes.

22. The method as claimed in claim 21 wherein the diluted tailings have a hydrocarbon diluent content and wherein the hydrocarbon diluent content is less than 3 percent by weight of the diluted tailings.

23. The method as claimed in claim 1 wherein the diluted tailings are comprised of a line mineral material fraction of a froth treatment tailings.

24. The method as claimed in claim 23 wherein the hydrocarbon diluent is comprised of a naphthenic type diluent.

25. The method as claimed in claim 23 wherein the hydrocarbon diluent is comprised of a paraffinic type diluent.

26. The method as claimed in claim 23 wherein the residence time is between 1 minute and 50 minutes.

27. The method as claimed in claim 26 wherein the diluted tailings have a hydrocarbon diluent content and wherein the hydrocarbon diluent content is greater than 3 percent by weight of the diluted tailings.

28. A method of separating a diluted tailings compromising a hydrocarbon diluent into a recovered diluent corn anent and a diluent recovered tailings component, wherein the diluted tailings are derived from to bitumen froth treatment process, the method comprising:
  (a) introducing the diluted tailings into an interior of a diluent recovery vessel so that the diluted tailings from a tailings pool in a tailings pool section of the diluent recovery vessel;
  (b) introducing an amount of steam directly into the tailings pool;
  (c) mixing the components of the diluted tailings and the steam which are contained in the tailings pool, wherein mixing is comprised of passing at least a portion of the diluted tailings from the tailings pool through a recirculation circuit which is in communication with the interior of the diluent recovery vessel so that the portion of the diluted tailings is recirculated back to the interior of the diluent recovery vessel as recirculated tailings;
  (d) maintaining the diluted tailings in the diluent recovery vessel for a residence time in order to separate the diluted tailings into the recovered diluent component and the diluent recovered tailings component;
  (e) recovering the recovered diluent component from the diluent recovery vessel; and
  (f) recovering the diluent recovered tailings component from the diluent recovery vessel.

29. The method as claimed in claim 28 wherein the recirculation circuit is in communication with at least one of the tailings pool and the interior of the diluent recovery vessel above the tailings pool so that the recirculated tailings are recirculated back to at least one of the tailings pool and the interior of the diluent recovery vessel above the tailings pool.

30. The method as claimed in claim 29 wherein the recirculation circuit is in communication with at least the tailings pool.

31. The method as claimed in claim 29 wherein the recirculation circuit is in communication with at least the interior of the diluent recovery vessel above the tailings pool.

32. The method as claimed in claim 31 wherein at least a portion of the recirculated tailings are recirculated so that they impinge upon a recirculation disperser located in the interior of the diluent recovery vessel above the tailings pool.

33. The method as claimed in claim 32 wherein the recirculation disperser is comprised of a recirculation stirrer.

34. The method as claimed in claim 32 wherein mixing the diluted tailings is further comprised of stirring, the diluted tailings in the tailings pool.

35. The method as claimed in claim 28 wherein the diluted tailings are introduced into the diluent recovery vessel at a feed rate by weight, wherein the diluted tailings are passed through the recirculation circuit at a recirculation rate by weight, and wherein the recirculation rate is between 25 percent and 100 percent of the feed rate.

36. The method as claimed in claim 35 wherein the recirculation rate is between 25 percent and 50 percent of the feed rate.

37. A method of separating a diluted tailings comprising a hydrocarbon diluent into a recovered diluent component and a diluent recovered, tailings component, wherein the diluted tailings are derived from a bitumen froth treatment process, the method comprising:
  (a) introducing the diluted tailings into an interior of a diluent recovery vessel so that the diluted tailings form a tailings pool in a tailings pool section of the diluent recovery vessel, wherein the diluent recovery vessel has a lower end and an upper end and wherein the tailings pool is formed at the lower end of the diluent recovery vessel;
  providing a foam breaking device in the interior of the diluent recovery vessel between the tailings pool and the upper end of the diluent recovery vessel, wherein the interior of the diluent recovery vessel defines a vessel axis and wherein providing the foam breaking device is comprised of rotating it foam breaker about a foam breaker axis which is parallel with the vessel axis;
  c) introducing an amount of steam directly into the tailings pool;
  d) mixing the components of the diluted tailings and the steam which are contained in the tailings pool;
  (e) maintaining the diluted tailings in the diluent recovery vessel for a residence time in order to separate the diluted tailings into the recovered diluent component and the diluent recovered tailings component;
  (f) recovering the recovered diluent component from the diluent recovery vessel; and
  (g) recovering the diluent recovered tailings component from the diluent recovery vessel.

38. The method as claimed in claim 37 wherein the foam breaker is comprised of a brush.

39. The method as claimed in claim 37 wherein mixing the diluted tailings is comprised of rotating a stirrer in the tailings pool about a stirrer axis which is parallel with the vessel axis.

40. The method as claimed in claim 39 wherein the foam breaker and the stirrer are both mourned on a stirring shaft and wherein the stirring shaft has a stirring shaft axis which is coincident with the foam breaker axis and the stirrer axis so that rotating the foam breaker and rotating the stirrer are both comprised of rotating the stirring shaft.

41. The method as claimed in claim 40 wherein mixing the diluted tailings is comprised of passing at least a portion of the diluted tailings from the tailings pool through a recirculation circuit which is in communication with the interior of the diluent recovery vessel above the tailings pool so that the portion of the diluted tailings is recirculated back to the interior of the diluent recovery vessel above the tailings pool as recirculated tailings, wherein the recirculated tailings are recirculated so that they impinge upon a recirculation disperser located in the interior of the diluent recovery vessel above the tailings pool, and wherein the recirculation disperser is comprised of the stirring shaft.

42. The method as claimed in claim 41 wherein the recirculation disperser is further comprised of a recirculation stirrer, wherein the recirculation stirrer is mounted on the stirring shaft, and wherein roman the stirring shaft rotates the recirculation stirrer.

43. A method of separating a diluted tailings comprising a hydrocarbon diluent into a recovered diluent component and a diluent recovered tailings component, wherein the diluted tailings are derived from a bitumen froth treatment process, the method comprising:
  (a) introducing the diluted tailings into an interior of a diluent recovery vessel so that the diluted tailings form a tailings pool in a tailings pool section of the diluent recovery vessel, wherein the diluent recovery vessel has a lower end and an upper end and wherein the tailings pool is formed at the lower end of the diluent recovery vessel;

(b) providing a foam breaking device in the interior of the diluent recovery vessel between the tailings pool and the upper end of the diluent recovery vessel, wherein the interior of the diluent recovery vessel defines a vessel axis, wherein the tailings pool section has a tailings pool cross-sectional area transverse to the vessel axis in the interior of the diluent recovery vessel, wherein providing the foam breaking device is comprised of providing a foam breaking cross-sectional area transverse to the vessel axis in the interior of the diluent recovery vessel, and wherein the foam breaking cross-sectional area is larger than the tailings pool cross sectional area;

(c) introducing an amount of steam directly into the tailings pool;

(d) mixing the components of the diluted tailings and the steam which are contained in the tailings pool;

(e) maintaining the diluted tailings in the diluent recovery vessel for a residence time in order to separate the diluted tailings into the recovered diluent component and the diluent recovered tailings component;

(f) recovering the recovered diluent component from the diluent recovery vessel; and (g) recovering the diluent recovered tailings component from the diluent recovery vessel.

44. The method as claimed in claim 43 wherein the interior of the diluent recovery vessel is comprised of a vertical column.

45. An apparatus for separating a diluted tailings comprising a hydrocarbon diluent into a recovered diluent component and a diluent recovered tailings component, wherein the diluted tailings are derived from a bitumen froth treatment process, the apparatus comprising:

(a) a diluent recovery vessel having a lower end, an upper end, an interior, and a tailings pool section at the lower end of the interior of the diluent recovery vessel;

(b) a diluted tailings inlet for introducing the diluted tailings into the interior of the diluent recovery vessel;

(c) a recovered diluent component outlet at the upper end of the diluent recovery vessel for recovering the recovered diluent component from the diluent recovery vessel;

d) a diluent recovered tailings component outlet at the lower end of the diluent recovery vessel for recovering the diluent recovered tailings component from the diluent recovery vessel;

(e) a steam distributor located in the tailings pool section of the diluent recovery vessel; and (f) a mixing device associated with the tailings pool section of the diluent recovery vessel, for mixing the diluted tailings which form a tailings pool in the tailings pool section of the diluent recovery vessel, wherein the mixing device is comprised of a stirrer which is located in the tailings pool section of the diluent recovery vessel.

46. The apparatus as claimed in claim 45, further comprising a foam breaking device located in the interior of the diluent recovery vessel between the tailings pool section of the diluent recovery vessel and the upper end of the diluent recovery vessel.

47. The apparatus as claimed in claim 45 wherein the steam distributor is configured to introduce steam into the tailings pool section of the diluent recovery vessel in a direction toward the lower end of the diluent recovery vessel.

48. An apparatus for separating a diluted tailings comprising a hydrocarbon diluent into a recovered diluent component and a diluent recovered tailings component, wherein the diluted tailings are derived from a bitumen froth treatment process, the apparatus comprising:

(a) a diluent recovery vessel having a lower end, an upper end, an interior, and a tailings pool section at the lower end of the interior of the diluent recovery vessel;

(b) a diluted tailings inlet for introducing the diluted tailings into the interior of the diluent recovery vessel;

(c) a recovered diluent component outlet at the upper end of the diluent recovery vessel for recovering the recovered diluent component from the diluent recovery vessel;

(d) a diluent recovered tailings component outlet at the lower end of the diluent recovery vessel for recovering the diluent recovered tailings component from the diluent recovery vessel;

(e) a steam distributor located in the tailings pool section of the diluent recovery vessel; and (f) a mixing device associated with the tailings pool section of the diluent recovery vessel, for mixing the diluted tailings which form a tailings pool in the tailings pool section of the diluent recovery vessel, wherein the mixing device is comprised of a recirculation circuit which is in communication with the interior of the diluent recovery vessel, for recirculating at least a portion of the diluted tailings from the tailings pool section back to the interior of the diluent recovery vessel as recirculated tailings.

49. The apparatus as claimed in claim 48 wherein the recirculation circuit is comprised of a pump for passing the recirculated tailings through the recirculation circuit.

50. The apparatus as claimed in claim 49 wherein the recirculation circuit is in communication with at least one of the tailings pool section and the interior of the diluent recovery vessel above the tailings pool section so that the recirculated tailings are recirculated back to at least one of the tailings pool section and the interior of the diluent recovery vessel above the tailings pool section.

51. The apparatus as claimed in claim 50 wherein the recirculation circuit is in communication with at least the tailings pool section.

52. The apparatus as claimed in claim 50 wherein the recirculation circuit is in communication with at least the interior of the diluent recovery vessel above the tailings pool section.

53. The apparatus as claimed in claim 52, further comprising a recirculation disperser located in the interior of the diluent recovery vessel above the tailings pool section.

54. The apparatus as claimed in claim 53 wherein the recirculation disperser is comprised of a recirculation stirrer.

55. The apparatus as claimed in claim 48 wherein the mixing device is further comprised of a stirrer which is located in the tailings pool section of the diluent recovery vessel.

56. An apparatus for separating a diluted tailings comprising a hydrocarbon diluent into a recovered diluent component and a diluent recovered tailings component, wherein the diluted tailings are derived from a bitumen froth treatment process, the apparatus comprising:

(a) a diluent recovery vessel having a lower end, an upper end, an interior, and a tailings pool section at the lower end of the interior of the diluent recovery vessel;

(b) a diluted tailings inlet for introducing the diluted tailings into the interior of the diluent recovery vessel;

(c) a recovered diluent component outlet at the upper end of the diluent recovery vessel for recovering the recovered diluent component from the diluent recovery vessel;

(d) a diluent recovered tailings component outlet at the lower end of the diluent recovery vessel for recovering the diluent recovered tailings component from the diluent recovery vessel;

(e) a steam distributor located in the tailings pool section of the diluent recovery vessel;

(f) a mixing device associated with the tailings pool section of the diluent recovery vessel, for mixing the diluted tailings which form a tailings pool in the tailings pool section of the diluent recovery vessel; and (g) a foam breaking device located in the interior of the diluent recovery vessel between the tailings pool section of the diluent recovery vessel and the upper end of the diluent recovery vessel, wherein the interior of the diluent recovery vessel defines a vessel axis, wherein the foam breaking device is comprised of a foam breaker, wherein the foam breaker has a foam breaker axis, wherein the foam breaker is rotatable about the foam breaker axis, and wherein the foam breaker axis is parallel with the vessel axis.

57. The apparatus as claimed in claim 56 wherein the foam breaker is comprised of a brush.

58. The apparatus as claimed in claim 56 wherein the mixing device is comprised of a stirrer which is located in the tailings pool section of the diluent recovery vessel.

59. The apparatus as claimed in claim 58 wherein the stirrer has a stirrer axis, wherein the stirrer is rotatable about the stirrer axis, and wherein the stirrer axis is parallel with the vessel axis.

60. The apparatus as claimed in claim 59 wherein the foam breaker and the stirrer are both mounted on a stirring shaft, wherein the stirring shaft has a stirring shaft axis which is coincident with the foam breaker axis and the stirrer axis, and wherein the stirring shaft is rotatable in order to rotate the foam breaker and the stirrer.

61. The apparatus as claimed in claim 60 wherein the mixing device is comprised of a recirculation circuit which is in communication with the interior of the diluent recovery vessel, for recirculating at least a portion of the diluted tailings from the tailings pool section back to the interior of the diluent recovery vessel above the tailings pool section as recirculated tailings, wherein the apparatus is further comprised of a recirculation disperser located in the interior of the diluent recovery vessel above the tailings pool section, and wherein the recirculation disperser is comprised of the stirring shaft.

62. The apparatus as claimed in claim 61 wherein the recirculation disperser is further comprised of a recirculation stirrer, wherein the recirculation stirrer is mounted on the stirring shaft, and wherein rotating the stirring shaft rotates the recirculation stirrer.

63. An apparatus for separating a diluted tailings comprising a hydrocarbon diluent into a recovered diluent component and a diluent recovered tailings component, wherein the diluted tailings are derived from a bitumen froth treatment process, the apparatus comprising:

(a) a diluent recovery vessel having a lower end, an upper end, an interior, and a tailings pool section at the lower end of the interior of the diluent recovery vessel;

(b) a diluted tailings inlet for introducing the diluted tailings into the interior of the diluent recovery vessel;

(c) a recovered diluent component outlet at the upper end of the diluent recovery vessel for recovering the recovered diluent component from the diluent recovery vessel;

(d) a diluent recovered tailings component outlet at the lower end of the diluent recovery vessel for recovering the diluent recovered tailings component from the diluent recovery vessel;

(e) a steam distributor located in the tailings pool section of the diluent recovery vessel;

(f) a mixing device associated with the tailings pool section of the diluent recovery vessel, for mixing the diluted tailings which form a tailings pool in the tailings pool section of the diluent recovery vessel; and (g) a foam breaking device located in the interior of the diluent recovery vessel between the tailings pool section of the diluent recovery vessel and the upper end of the diluent recovery vessel, wherein the interior of the diluent recovery vessel defines a vessel axis, wherein the tailings pool section has a tailings pool cross-sectional area transverse to the vessel axis in the interior of the diluent recovery vessel, wherein the foam breaking device is comprised of a foam breaking cross-sectional area transverse to the vessel axis in the interior of the diluent recovery vessel, and wherein the foam breaking cross-sectional area is larger than the tailings pool cross-sectional area.

64. The apparatus as claimed in claim 63 wherein the interior of the diluent recovery vessel is comprised of a vertical column.

* * * * *